United States Patent [19]
Perry et al.

[11] Patent Number: 5,278,758
[45] Date of Patent: Jan. 11, 1994

[54] METHOD AND APPARATUS FOR NUCLEAR LOGGING USING LITHIUM DETECTOR ASSEMBLIES AND GAMMA RAY STRIPPING MEANS

[75] Inventors: Carl A. Perry, Middletown; Guy A. Daigle, Plainville; William Bruck, Glastonbury; Roy Nordstrom, Durham, all of Conn.; Steven Rountree, Layafette, La.; Joseph Dudek, Jr., Southington, Conn.; James Tsang, Manalapan, N.J.; Leonard Goldman, Merion Station, Pa.

[73] Assignee: Baker Hughes Incorporated, Houston, Tex.

[21] Appl. No.: 513,953

[22] Filed: Apr. 17, 1990

[51] Int. Cl.⁵ .................. E21B 47/00; G01V 5/10
[52] U.S. Cl. ................................................ 364/422
[58] Field of Search ................ 364/422; 250/254, 266, 250/264

[56] References Cited
U.S. PATENT DOCUMENTS

| | | |
|---|---|---|
| 4,216,536 | 8/1980 | Moore . |
| 4,807,157 | 2/1989 | Fukushima et al. ............ 340/995 |
| 4,829,176 | 5/1989 | Paske et al. . |
| 4,862,374 | 8/1989 | Ziemann ..................... 340/995 |
| 4,879,463 | 11/1989 | Wraight et al. . |
| 4,904,865 | 2/1990 | Meisner et al. . |
| 4,943,925 | 7/1990 | Moroto et al. ............... 340/995 |

*Primary Examiner*—Gail O. Hayes
*Attorney, Agent, or Firm*—Fishman, Dionne & Cantor

[57] ABSTRACT

A method and apparatus for nuclear logging, and in particular, neutron porosity logging is presented. In accordance with the present invention, a pair of spaced lithium detectors, preferably $Li^6I$ crystal or $Li^6$ doped glass are used to detect neutrons emitted from a borehole formation being logged. In addition, novel data processing is used to strip the gamma-ray peak from the spectrum developed by the lithium detectors.

48 Claims, 29 Drawing Sheets

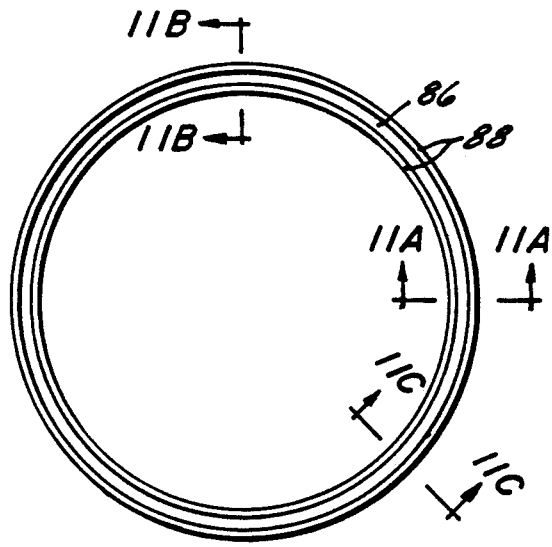
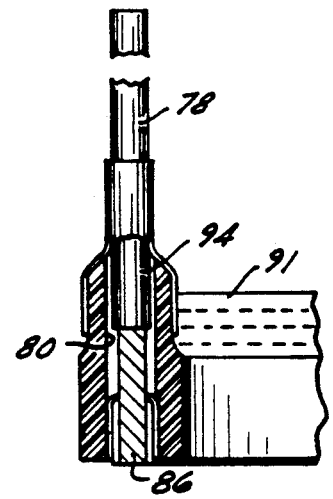
FIG. 11　　　　　FIG. 11A
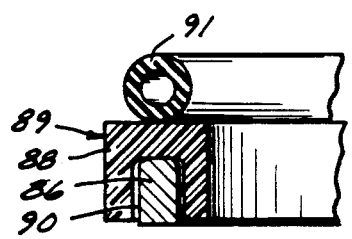
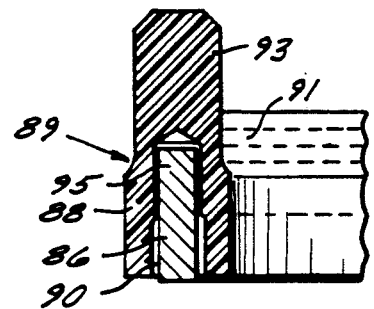
FIG. 11C　　　　　FIG. 11B
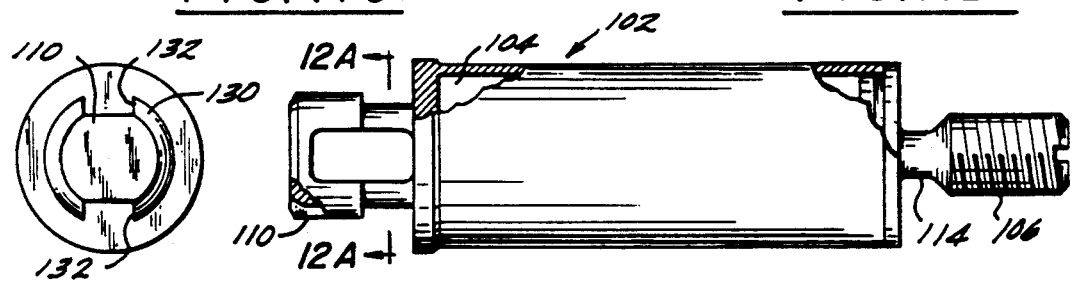
FIG. 13　　　　　FIG. 12
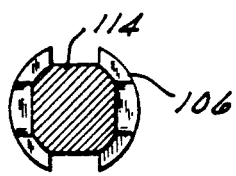
FIG. 12A

FITTING OF EXPONENTIAL FUNCTION
TO GAMMA PEAK

SPECTRUM AFTER SUBTRACTION
OF THE EXPONENTIAL FUNCTION

METHOD AND APPARATUS FOR NUCLEAR LOGGING USING LITHIUM DETECTOR ASSEMBLIES AND GAMMA RAY STRIPPING MEANS

CROSS-REFERENCE TO RELATED APPLICATIONS

This application is related to the following applications, all of which are being filed contemporaneously with this application:

(1) U.S. application Ser. No. 511,537 now U.S. Pat. No. 5,144,126, filed Apr. 17, 1990 entitled "Apparatus for Nuclear Logging Employing Sub Wall Mounted Detectors and Electronics, and Modular Connector Assemblies", invented by Carl A. Perry, Guy A. Daigle, Steven Rountree, George T. Talmadge, John Grunbeck and Mark Wassell;

(2) U.S. application Ser. No. 510,082 now U.S. Pat. No. 5,126,564 filed Apr. 17, 1990 entitled "Apparatus for Nuclear Logging Employing Sub Wall Mounted Nuclear Source Container and Nuclear Source Mounting Tool", invented by Carl A. Perry and Guy A. Daigle;

(3) U.S. application Ser. No. 511,538 now U.S. Pat. No. 5,083,134 filed Apr. 17, 1990 entitled "Nuclear Logging Tool Electronics Including Programmable Gain Amplifier and Peak Detection Circuits" invented by Roy Nordstrom.

BACKGROUND OF THE INVENTION

This invention relates generally to borehole logging apparatus and methods for performing radiation based measurements. More particularly, this invention relates to a new and improved apparatus for effecting neutron porosity logging in real time wherein the improved nuclear logging apparatus comprises a measurement-while-drilling (MWD) tool.

Oil well logging has been known for many years and provides an oil and gas well driller with information about the particular earth formation being drilled. In conventional oil well logging, after a well has been drilled, a probe known as a sonde is lowered into the borehole and used to determine some characteristic of the formations which the well has traversed. The probe is typically a hermetically sealed steel cylinder which hangs at the end of a long cable which gives mechanical support to the sonde and provides power to the instrumentation inside the sonde. The cable (which is attached to some sort of mobile laboratory at the surface) is also the means by which information is sent up to the surface. It thus becomes possible to measure some parameter of the earth's formations as a function of depth, that is, while the sonde is being pulled uphole. Such measurements are normally done in real time (however, these measurements are taken long after the actual drilling has taken place).

A sonde usually contains some type of source (nuclear, acoustic, or electrical) which transmits energy into the formation as well as a suitable receiver for detecting the same energy returning from the formation. The present invention relates to logging apparatus wherein the source emits nuclear energy, and more particularly neutrons. When using this type of source, the source sends out "fast" (high energy) neutrons into the formation. The fast neutrons leaving the source enter the formation and slow down by losing energy as a result of collisions with the nuclei of the formation, finally becoming thermalized. By thermalized, it is meant that, on the average, the neutrons lose as much energy as they gain as a result of collisions, that is, they are in thermal equilibrium with the nuclei of the formation. After some time spent diffusing as thermal neutrons, they may be captured by one of the formation nuclei resulting in the emission of a gamma ray. The energy of the gamma ray emitted is characteristic of the particular nucleus involved. It is in this context that the term "thermal capture gamma-ray spectra" is used. Examples of well logging tools of this type are disclosed in U.S. Pat. Nos. 3,379,882, 3,662,179, 4,122,338, 4,223,218, 4,224,516, 4,267,447, 4,292,518, 4,326,129 and 4,721,853.

Fast neutrons as a probe source are useful for several reasons. For example, chemical sources for the fast neutrons such as $Am^{241}Be$ and $Pu^{238}Be$ are readily available. Fast neutrons also have a reasonable degree of penetration into matter, and finally most importantly, neutrons can be especially useful for the detection of hydrogen. To understand the effect of hydrogen, it is helpful to use the analogy of a group of billiard balls in which the neutron and the hydrogen nucleus are balls having essentially the same mass while the nuclei of other elements in the formation are balls with much larger masses. Thus, if a neutron collides with the nucleus of an element other than hydrogen, it will generally lose very little energy. If it collides with a hydrogen nucleus, because the masses are nearly equal, it can lose all of its energy. The ability of a formation to slow down fast neutrons to thermal energy then depends primarily on the hydrogen density.

With regard to hydrogen density in a formation, two diametrically opposed situations may be considered. In the first situation, a group of fast neutrons leave a source and slow down in a formation free of hydrogen, and in a second situation, a group of fast neutrons leave a source and slow down in a formation which has a great deal of hydrogen in it. One expects and will find that the neutrons will have gone much farther away from the source in the first case than in the second case. As a result of the foregoing, a technique which has been in use in "wireline oil well logging" for more than thirty years is the measurement of the spatial distribution of slowed down neutrons. This technique is usually described as neutron porosity logging because the porosity of the formation is inferred from the measurement. Here it is tacitly assumed that the pores of the formation are filled with either water or oil (an assumption not always true since there may be gas or a mix of all three components). It is also assumed that the hydrogen density for oil and water are equal (that assumption is also not strictly true, but can be safely assumed for all practical purposes).

In order to construct a neutron porosity sonde which looks at the spatial distribution of slowed down neutrons, one needs a source of sufficient intensity (for example, $10^7$ neutrons/sec), and a detector separated from the source (for example, 15 inches). There needs further to be sufficient shielding between the source and detector to keep the radiation coming directly through the sonde to a minimum. Further features needed in the sonde involve reducing the response of the sonde to factors other than porosity, such as borehole size, salinity, etc. Evolution in the prior art of this type of sonde has consisted primarily in changes in the type of detector used. Originally, Geiger counters with heavy walls were used. These counters did not detect neutrons but rather gamma rays originating in the formation as a result of thermal neutron capture. The gamma rays strike the walls of the counter releasing photoelectrons which in turn cause ionization which can be detected by the counter. Although such detectors are very rugged, they suffer from the disadvantage of not directly counting the slowed down neutrons.

For a thermal or epithermal neutron detector placed at a sufficiently large distance, for example, 15 inches from the source, it can be shown that the count rate of the detector is of the form $A \exp(-r/L)$ where $A$ is some constant which depends on the source-detector distance and the counting efficiency of the detector, $r$ is the distance between source and detector, and $L$ is some parameter which depends on the slowing down (of neutrons) properties of the formation, i.e., the porosity. For a formation containing no hydrogen, $L$ will be relatively large as compared with a formation which is quite porous where $L$ will be significantly smaller.

It is important to note that the transport of fast neutrons through a formation is characterized by three phases: (1) slowing down to thermal energy; (2) diffusion at thermal energy; and (3) capture by a formation nucleus accompanied by the emission of a characteristic gamma ray by the excited nucleus. Only the first phase gives information related directly to the presence of hydrogen.

Since neutrons are not charged particles, their detection presents some special problems. The better detectors usually depend on the neutron undergoing some kind of nuclear reaction, one of whose products is in turn an ionizing particle such as an alpha particle. As a result of improvements in technology, the single detector neutron sonde using a heavy-walled Geiger counter was modified with the replacement of the Geiger counter by a $He^3$ proportional counter (normal He is $He^4$). $He^3$ has an unusually high capture cross section for thermal neutrons, and the reaction products (ionizing) are a proton and a triton ($H^3$). A proportional counter is used since it gives good discrimination against gamma rays.

The single $He^3$ detector neutron sonde (detecting epithermal neutrons) was thereafter replaced by a two detector neutron sonde (detecting thermal neutrons). The two detector sonde was viewed as being less sensitive to effects of borehole conditions. Thermal detection of neutrons was chosen because count rates were higher than with epithermal detection. In this development, the ratio of the count rates of the two detectors (near and far from the source) are determined. Instead of looking at the spatial distribution of neutrons, the rate of change of the spatial distribution is being observed. A further refinement of this technique is to look at the rate of change of the spatial distribution for epithermal neutrons.

The foregoing description of prior art nuclear formation logging device relates primarily to wire line devices wherein the formation evaluation is done after drilling is completed. More recently, a new generation of formation evaluation tools has been developed which evaluate the earth formation without interrupting the drilling of a borehole. These tools are known as measurement-while-drilling or MWD tools. A typical commercial MWD tool (such as is available from Teleco Oilfield Services, Inc., assignee of the present application) may measure such downhole conditions as the so-called weight-on-bit or "WOB" as well as the torque acting on the bit, the azimuth direction and the angle of inclination of the borehole, borehole temperature, mud resistivity and various characteristics of the earth formations penetrated by the bit. The output signals of the various sensors are coupled to circuits which selectively control a downhole pressure pulse signaller in the tool for successively transmitting and/or recording encoded data signals (i.e, pressure pulses) representative of these real-time measurements through the mud stream in the drill string to suitable detecting-and-recording apparatus at the surface.

It will, of course, be appreciated that MWD tools have been proposed heretofore for providing real-time measurements of different radioactivity characteristics of earth formations being penetrated by the drill bit. Since measurement of natural gamma radiation requires only a gamma-ray detector and typical circuits to control the signaller, it has not been difficult to provide MWD tools with that instrumentation. Conversely, to measure other radioactivity characteristics of earth formations, a MWD tool must also have an appropriate source of radiation (e.g., radioactive chemical source) as described above. It is far more difficult to construct a MWD tool of this type (which includes a source of radiation). While such tools have been disclosed (for example, see U.S. Pat. Nos. 4,814,609 and 4,829,176), there is a continuing need for improved MWD tools for nuclear well logging which include nuclear sources.

SUMMARY OF THE INVENTION

In accordance with the present invention, a new and improved MWD tool for performing neutron logging is provided. The present invention comprises a two detector neutron tool. In accordance with an important feature of this invention, the detectors incorporate the $Li^6$ isotope of lithium (i.e., $Li^6I$ crystal or $Li^6$ doped glass). The reaction products resulting from a neutron interacting with $Li^6$ are an alpha particle and a triton. The lithium crystal or glass is fixed to the face of a photomultiplier tube and the light scintillations which occur therein as a result of neutrons interacting with the lithium are detected and the resultant signal is amplified by the photomultiplier. The lithium crystal or glass is wrapped with a reflective material to improve the light collection for the photomultiplier tube. These detector components are all appropriately packaged for reducing vibrational damage.

Heretofore, it has been generally accepted that lithium crystal or glass detectors were not practical for tools of this type because of problems associated with gamma-ray discrimination. In the case of the $He^3$ proportional counter, the pulse heights from neutrons are usually an order of magnitude larger than those arising from gamma rays, making discrimination quite simple. For $Li^6I$ and $Li^6$ glass, the pulse heights from neutrons and gamma rays are comparable in magnitude. Of the two scintillators, $Li^6I$ is inherently more sensitive to gamma rays because of the presence of iodine which is a high Z (atomic number) material. Nonetheless, the choice of $Li^6$ glass does not remove the problem of gamma-ray discrimination. However, in accordance with another important feature of this invention, gamma-ray discrimination is accomplished using a novel data processing technique. Using this technique, after a spectrum of particle energies has been acquired, a microprocessor will fit an exponential curve to the spectrum that approximates the portion of the spectrum contributed by the gamma rays. After the gamma characterization is done, the novel software then strips the gamma rays out of the raw spectrum. This is accomplished by subtracting the gamma-ray spectrum from the raw spectrum. As a result of this subtraction, the gamma peak is now absent and the spectrum contains counts that are due only to neutrons. If the microprocessor integrates the counts, under the neutron peak, then the resulting summation will yield the total or gross number of neutrons in the spectrum. The actual neutron count rate is then calculated by dividing the gross neutron count by the time over which a spectrum is collected. This calculation will produce a value whose units are neutrons per second.

This important gamma-ray stripping software technique permits the practical use of lithium detectors, which as mentioned, have been previously thought to be problematic as a detector in a nuclear well logging tool. The use of lithium detectors provided substantial advantages over both prior art $He^3$ detectors and Geiger counters. $He^3$ detectors are often incapable of correctly operating in the harsh vibrational environment existing during the drilling of an oil well. Although Geiger counters and proportional counters are similar in geometry, the latter are more fragile because they generally require a much finer central wire for their operation. Conversely, the lithium detectors of this invention are more rugged and can withstand the extremely harsh downhole drilling environment.

The present invention also provides data processing means for determining total background gamma counts detected by the detector assemblies.

The neutron tool of this invention comprises a steel collar section (sub). Power and signal transmission is effected using a single power and signal bus (e.g., a wire) which runs the length of the tool. This power bus terminates at either end of the tool at a modular connector comprised of a conductive metal ring housed within an insulator. All components of the device are mounted in the sub collar wall including the radioactive source, detector assemblies and all associated electronics. Three compartments or hatches (equipped with removable high pressure hatch covers) are provided inside the wall of the drill collar for receiving the tool electronics. A first hatch (known as the Detector Hatch) includes the near and far detector assemblies and a signal buffer board. A second hatch (known as the modular tool interface or MTI Hatch) contains a low voltage power supply (for powering the conventional electronic parts) and modem on a MTI board; and a high voltage power supply for powering the photomultipliers. A third hatch (known as the Processor Hatch) includes a multichannel analyzer and microprocessor for collecting and storing spectra over preselected time periods and then processing those spectra to obtain neutron counts and gamma counts.

The mounting of the detector units and other electronic components within the subwall under a removable high pressure hatch cover offers many advantages over prior art detector mounting methods including ease of installation and removal, accessibility for diagnosis and adjustment, close proximity of detectors to the outside of the tool and the actual formation wall and facilitates placement of shielding around the detectors.

The nuclear source is loaded in a novel nuclear source container which is compatible to the environment encountered in downhole MWD drilling and logging. The source container is a rugged unit designed to withstand stresses, pressures and temperatures experienced in downhole oil drilling. It houses a dimensionally small Nuclear Regulatory Commission (NRC) approved logging source and adapts it to large downhole hardware by means of a closely controlled diameter, length and thread. On the opposite end of the thread which secures it to the logging device is a novel bayonet which is configured to engage and lock the source assembly into the receptacle of a novel installation and removal tool. The shank of the threaded end is smaller and thus weaker than the bayonet end to ensure the successful removal of the source from the logging tool. This novel bayonet design also ensures that no person without compatible equipment will be able to handle the source; and that removal of the source will be fast and safe.

In accordance with still another feature of this invention, the centerline of the nuclear source is located orthogonal to the axis of the tool in a thick walled section of the tool so that the centerline of the active portion of the source is approximately in line with the axis of the detectors being used.

The electronics associated with the nuclear logging tool of this invention utilize multichannel analysis wherein the input comprises a train of analog pulses, each corresponding to the absorption of a neutron or gamma ray and wherein the amplified output is observed over a selected time interval and a pulse height distribution is constructed therefrom. The electronic processing circuitry includes at least two novel components, namely a programmable gain amplifier (PGA) and a high speed peak detector.

The primary feature of the PGA is that its gain can be varied and controlled digitally (using a digital bus). The PGA both amplifies detector pulses and modifies the frequency characteristics of signals that enter it. The PGA includes a low pass filter function which significantly improves the signal to noise ratio and preserves system resolution by limiting the high frequency signal content in each pulse. By limiting the high frequency signal content, pulse amplitudes are more easily quantified by the multichannel analysis (MCA) function thus resulting in better quality spectra.

The high speed peak detector receives the output from the PGA and is important as it converts a short, transient amplitude into a stable DC signal which can easily be measured with an A/D converter.

The above-discussed and other features and advantages of the present invention will be appreciated and understood by those skilled in the art from the following detailed description and drawings.

DESCRIPTION OF THE DRAWINGS

Referring now to the drawings, wherein like elements are numbered alike in the several FIGURES:

FIG. 11 is an end view of the modular connector assembly;

FIGS. 11A, 11B and 11C are cross sectional elevation views along the lines 11A—11A, 11B—11B and 11C—11C, respectively of FIG. 11;

FIG. 12 is a side elevation view, partly in cross-section, of the nuclear source container for use in the present invention;

FIG. 12A is a view along the line 12A—12A of FIG. 12;

FIG. 13 is a left end view of the source container of FIG. 12;

DESCRIPTION OF THE PREFERRED EMBODIMENT

Figure 1:
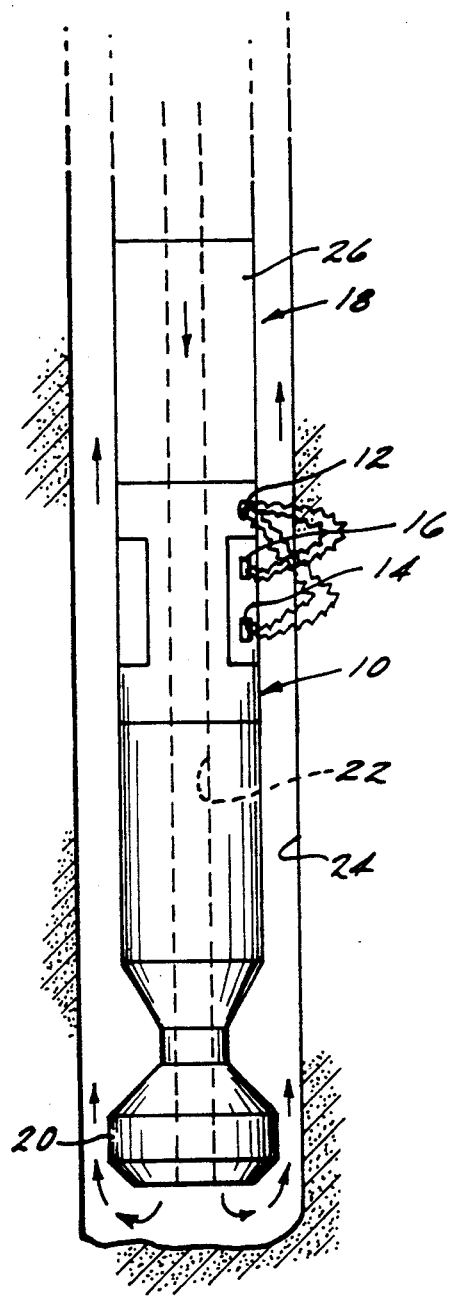
FIG. 1 is a diagrammatic view of a neutron porosity tool in accordance with the present invention.
Figure 6:
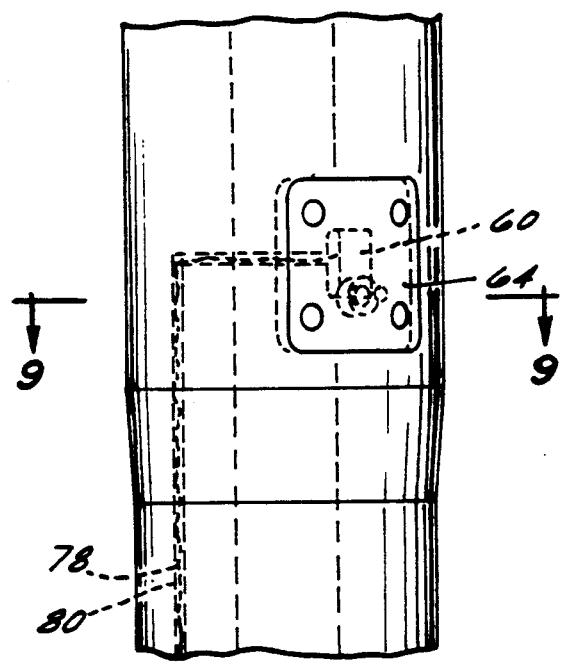
FIG. 6 is an enlarged view of a modular connector junction hatch in the tool of FIG. 2.

Referring first to FIG. 1, a diagram of the basic components for a neutron porosity tool 10 in accordance with the present invention is shown. This tool comprises a drill collar which contains a neutron source 12 and two spaced neutron detector assemblies 14 and 16. All three components are placed along a single axis that has been located parallel to the axis of the tool. The detector closest to the neutron source will be referred to as the "near detector" and the one furthest away is referred to as the "far detector".

The tool 10 is placed into service by loading it with a sealed chemical source (typically a 5 Curie Americium Beryllium) and lowering it into a formation. Fast neutrons (approximate average 4.4 MeV) are continuously emitted by the source and these propagate out into the formation. The fast neutrons interact with the formation and are slowed down (thermalized) by hydrogen that is present in the environment surrounding the tool.

Most of the neutrons that are emitted by the source are thermalized and absorbed by the formation surrounding the tool. Some of the remaining thermal neutrons will then get counted by either the near or far detectors and contribute to the data collected by the tool.

Calibration of the tool is accomplished by the use of laboratory formations. These specially built formations allow the tool response to be characterized for various porosities, borehole size and lithologies. In any given laboratory formation the basic measurement that is taken from the tool is the ratio. The ratio is computed by dividing the near count rate by the far count rate. After the ratio has been characterized, in all of the laboratory formations, it is possible to generate calibration curves. These calibration curves translate the tools ratio into the porosity of a formation being logged.

Still referring to FIG. 1, tool 10 is preferably associated with a measurement-while-drilling (MWD) system and comprises a sub section of a drill string 18 which terminates at a drill bit 20. Drillstring 18 has an open internal diameter 22 in which drilling mud flows from the surface, through the drillstring and out of the drill bit. Drill cuttings produced by the operation of drill bit 20 are carried away by a mud stream rising up through the free annular space 24 between the drillstring and the wall of the well. The mud column in drillstring 18 may also serve as the transmission medium for carrying signals of downhole parameters to the surface. This signal transmission is accomplished by the well known technique of mud pulse generation whereby pressure pulses are generated in the mud column in drillstring 18 representative of sensed parameters down the well. The drilling parameters are sensed in a sensor unit in a drill collar 26 near or adjacent to the drill bit. Pressure pulses are established in the mud stream within drillstring 18, and these pressure pulses are received by a pressure transducer and then transmitted to a signal receiving unit which may record, display and/or perform computations on the signals to provide information of various conditions down the well. The method and apparatus for this mud pulse telemetry is described in more detail in U.S. Pat. Nos. 3,982,431, 4,013,945 and 4,021,774, all of which are assigned to the assignee hereof and fully incorporated herein by reference.

Tool Construction and Mounting of Electronic Components and Detectors

Figure 2:
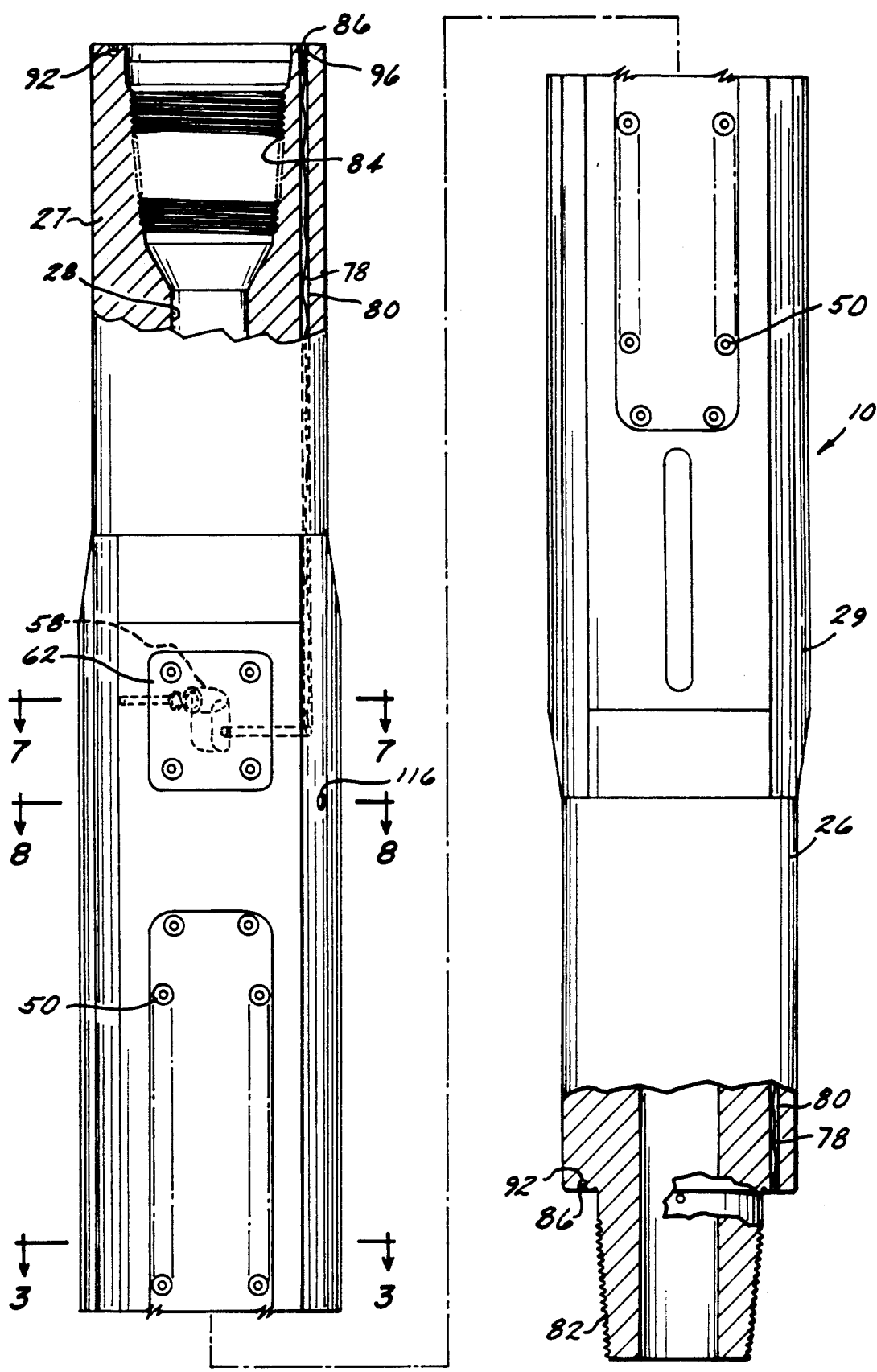
FIG. 2 is a side elevation view, partly in cross section, of the nuclear logging tool in accordance with the present invention.
Figure 3:
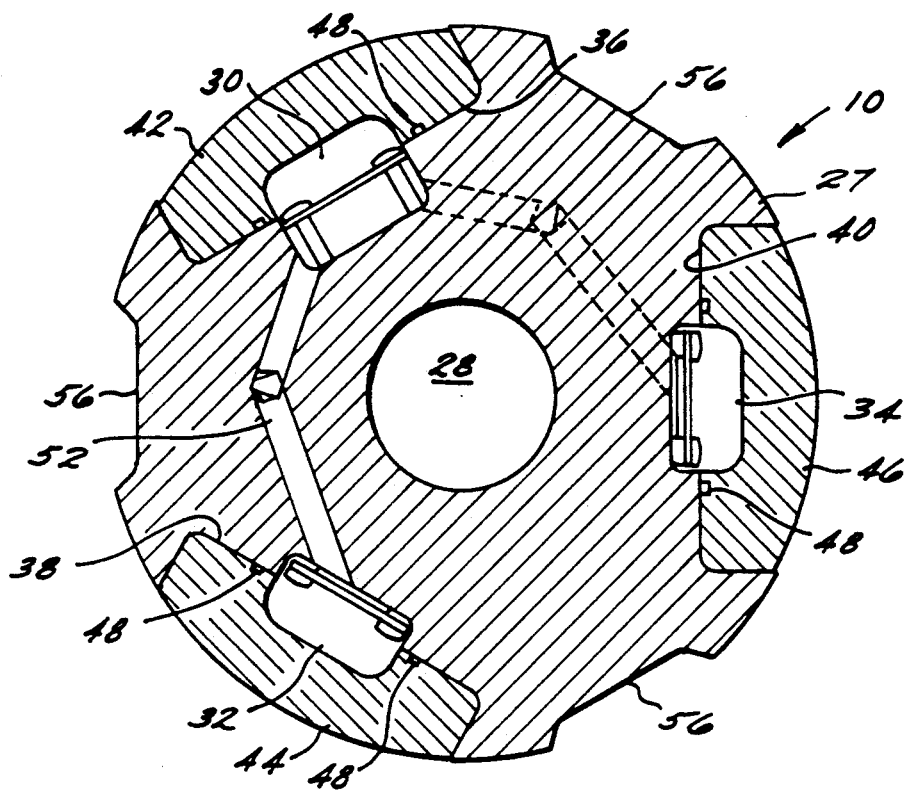
FIG. 3 is a cross sectional elevation view along the line 3—3 of FIG. 2.
Figure 4:
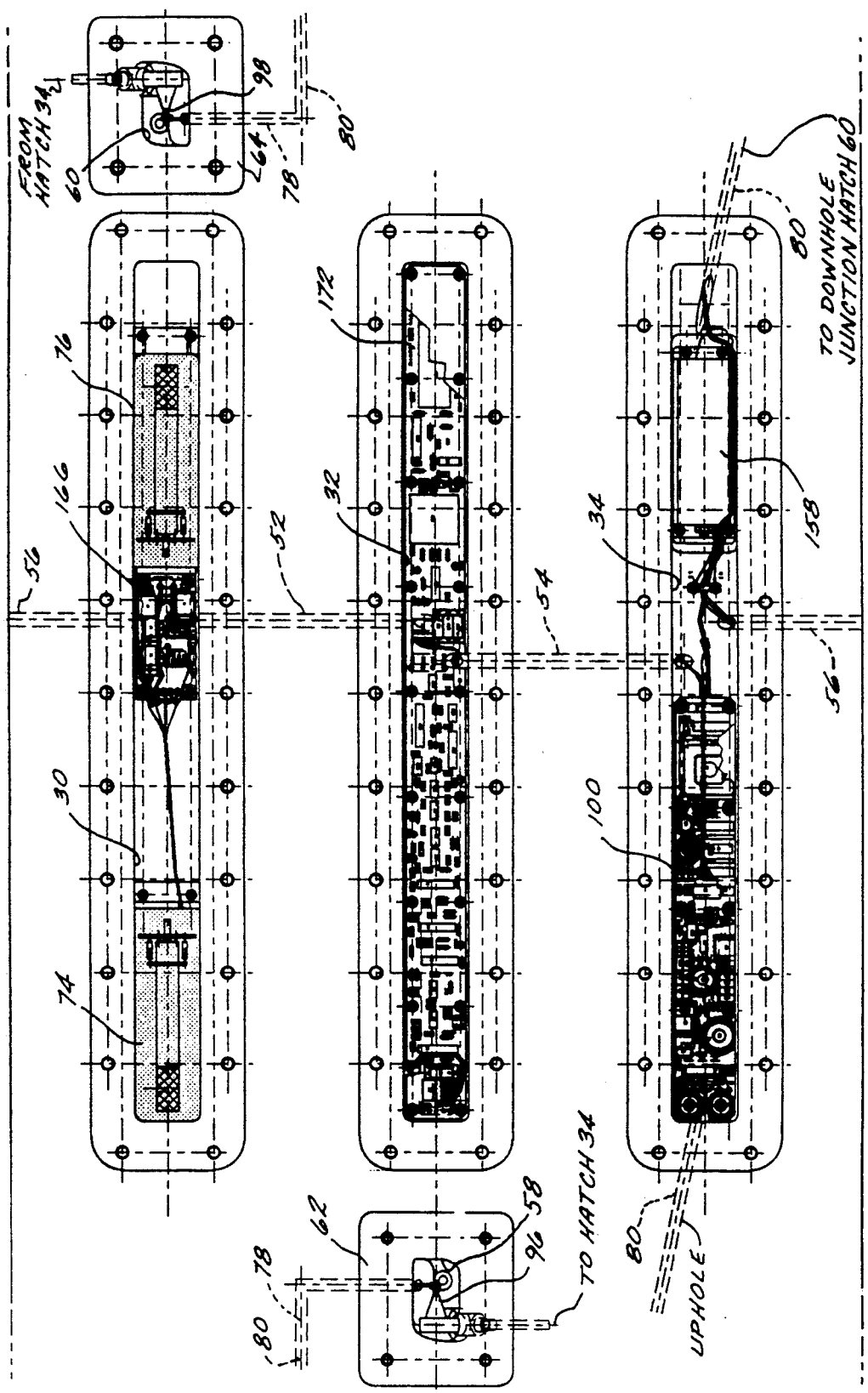
FIG. 4 is a plan view of the detector, processing and MTI hatches of the tool of FIG. 2 with the hatch covers being removed and with the circumference of the tool being shown in a single plane.
Figure 5:
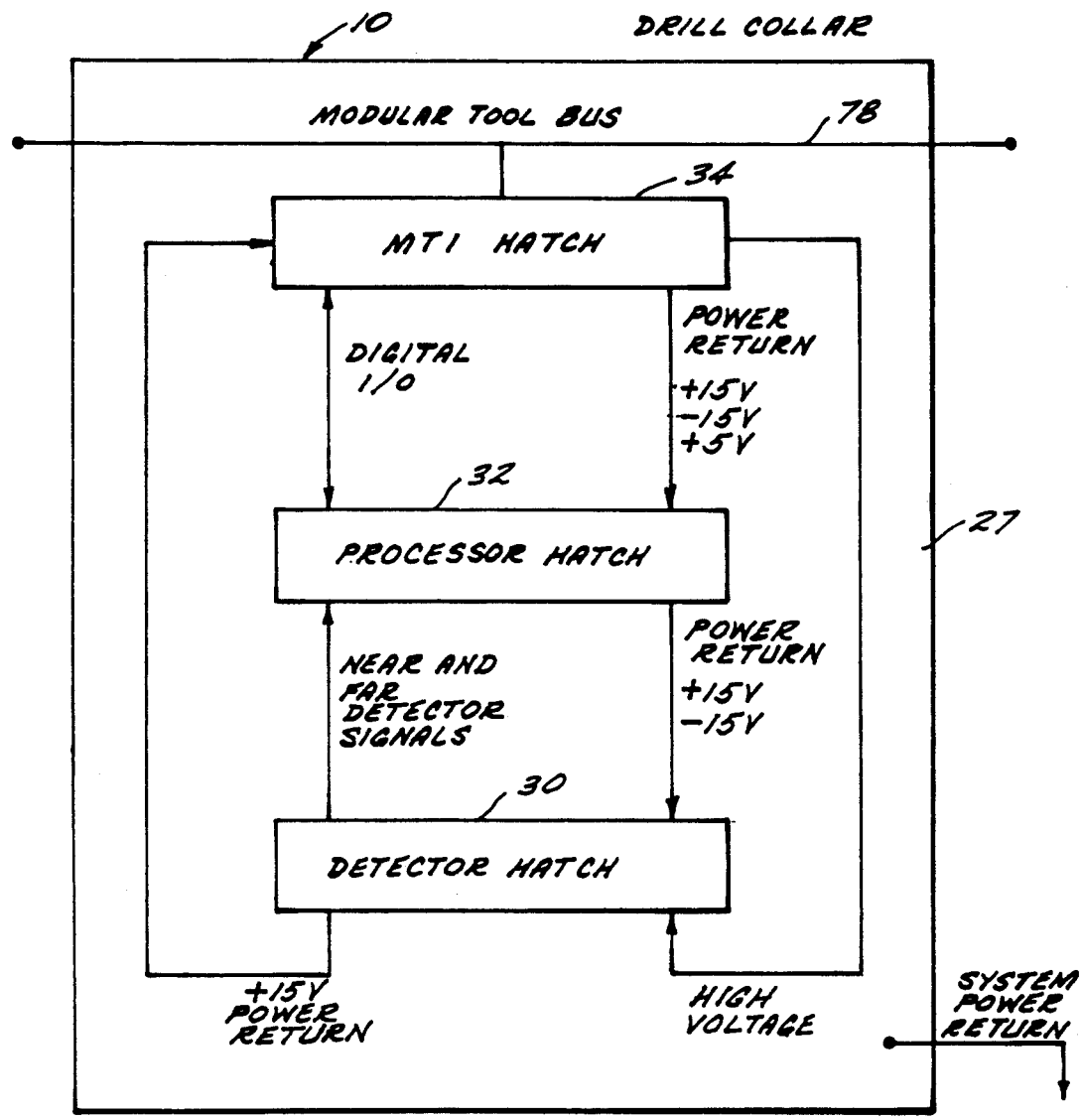
FIG. 5 is a diagrammatic view of the tool of FIG. 2 including the detector, processing and MTI hatches.

Referring now to FIGS. 2-5, the nuclear logging tool of this invention is shown generally at 10 in FIG. 2 and diagrammatically at 10 in FIG. 5. It will be appreciated that FIG. 4 is a depiction of an entire circumference of the central portion of tool 10 shown in a single plane. The tool comprises a steel drill collar sub 27 having an axial opening 28 along the length thereof. As best shown in FIGS. 3 and 4, sub 27 includes three equi-spaced chambers or hatches 30, 32 and 34 for housing the tool electronics and detectors. Hatch 30 will be referred to as the "detector" hatch; hatch 32 will be referred to as the "processing" hatch and hatch 34 will be referred to as the "modular tool interface" or "MTI" hatch. The hatches 30, 32, 34 are machined pockets and each includes a precision surface 36, 38 and 40 to permit the formation of a high pressure seal with a hatch cover 42, 44 and 46, respectively (with the hatch covers being removed in FIG. 4). A groove is provided in each hatch cover 42, 44 and 46 for receiving a suitable high pressure sealing means such as O-ring 48. It will be appreciated that each surface 36, 38 and 40 acts both as the drilling fluid sealing surfaces as well as a load bearing surface for each respective hatch cover. As shown in FIG. 2, each hatch cover 42, 44 and 46 is secured to a respective surface 36, 38 and 40 by high tensile strength, corrosion resistant bolts 50 of sufficient size and number (preferably 22) to maintain seal integrity over a wide range of downhole conditions including pressure, temperature, torsion and bending. Hatch 30 is interconnected with hatch 32 by a passageway 52 through the subwall 27. Similarly, hatch 32 is connected to hatch 34 by a passageway 54 and hatch 34 is connected to hatch 30 by a passageway 56 (see FIG. 4). The central portion 29 of tool 10 which includes hatches 30, 32 and 34 has an increased diameter relative to the opposed ends of tool 10. For example, if the ends of tool 10 have a 6¾" outer diameter (OD), central portion 29 may have a 7½" OD. Within this enlarged central portion 29 and between each hatch cover 30, 32 and 34 is a longitudinal passageway 56. Passageways 56 provide increased flow of drilling fluid between tool 10 and the borewall.

Figure 9:
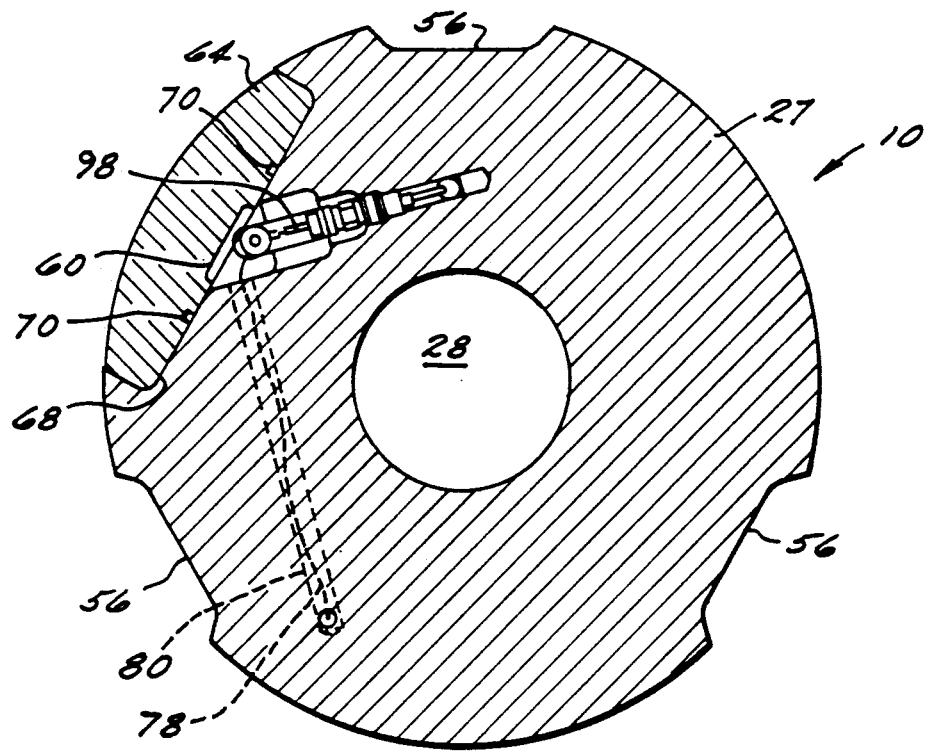
FIG. 9 is a cross sectional elevation view along the line 9—9 of FIG. 6.
Figure 7:
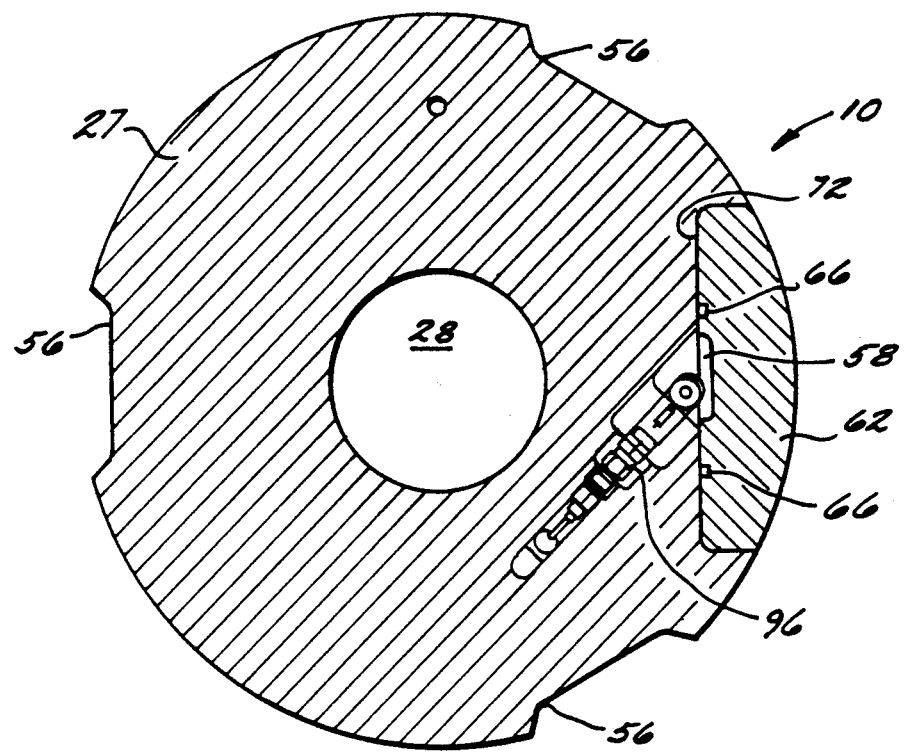
FIG. 7 is a cross sectional elevation view along the line 7—7 of FIG. 2.

Referring to FIGS. 2, 4, 6, 7 and 9, sub 27 also includes an uphole junction hatch 58 (FIG. 2) and a downhole junction hatch 60 (FIG. 6) As in the previously discussed hatches, each junction hatch 58, 60 is associated with a junction hatch cover 62, 64, respectively. Cover 62 utilizes an O-ring 66 to form a high pressure fluid tight seal with a flat surface 72 surrounding hatch 58 (FIG. 7). Similarly, junction hatch cover 64 utilizes an O-ring 70 to form a high pressure fluid tight seal with a flat surface 68 surrounding hatch 60 (FIG. 9). As will be discussed below, each junction hatch 58, 60 provides a chamber for effecting an electrical connection between the electronics disposed in hatches 30, 32 and 34 and a modular connector provided on either end of tool 10. In addition, each junction hatch 58, 60 serves as a pressure bulkhead so that in the event of a failure (e.g. leak) of the modular connector bus (described below), drilling fluid will be precluded from flowing into hatches 30, 32 or 34.

The thick walled sub 27 is the structural portion of tool 10 which transmits torque and weight to the lower portion of the drillstring and the method of mounting the detector units and electronic components within the thick subwall 27 is an important feature of this invention. Mounting of the detector assemblies and other electronics within hatches 30, 32 and 34 under a removable high pressure hatch cover 42, 44 and 46, respectively provides many features and advantages including ease of installation and removal of components from within the hatches and ease of accessibility to the detectors and electronic components for diagnosis and adjustment. Also, the use of chambers 30, 32 and 34 permits the positioning of the detectors (identified at 74 and 76 in chamber 30 in FIG. 4) as close as possible to both the outside of the tool and the formation wall.

Tool Power and Communications Bus and Modular Tool Interface Hatch Electronics As mentioned briefly above, the nuclear logging tool 10 of this invention utilizes a bus which comprises a single wire (see item 78 in FIGS. 2 and 5) that runs the full length of the tool sub 27 through a longitudinal bore 80 (Parallel to the centerline of the tool) and is used to supply both power and communications to all locations in the tool. A power return is established for the system by using the steel drill collar 27 (that composes the body of tool 10) as the common return path and system ground.

A significant feature of tool 10 is its ability to be used in a modular system. The construction of sub 27 discussed above (including the power and communications bus 78 and hatches 30, 32 and 34) lends itself for use, not only as a neutron porosity device, but also in other applications such as a gamma density tool or other downhole MWD tools. Accordingly, each end of tool 10 is designed to create what is known as a "modular tool connector". Referring to FIGS. 2, 11 and 11A-E, when the pin 82 and box 84 of two adjacent modular tools are mated, ring connectors 86 (of the type disclosed in U.S. Pat. No. 3,696,332) inside the joint establish continuity for the modular tool bus. The power returns of the two tools are also joined because the pin and box threads are making electrical contact (see FIG. 11D). Thus, the tool is a two conductor system created by the bus 80 (FIG. 2) and drill collar 27 (FIG. 3).

Figure 11D:
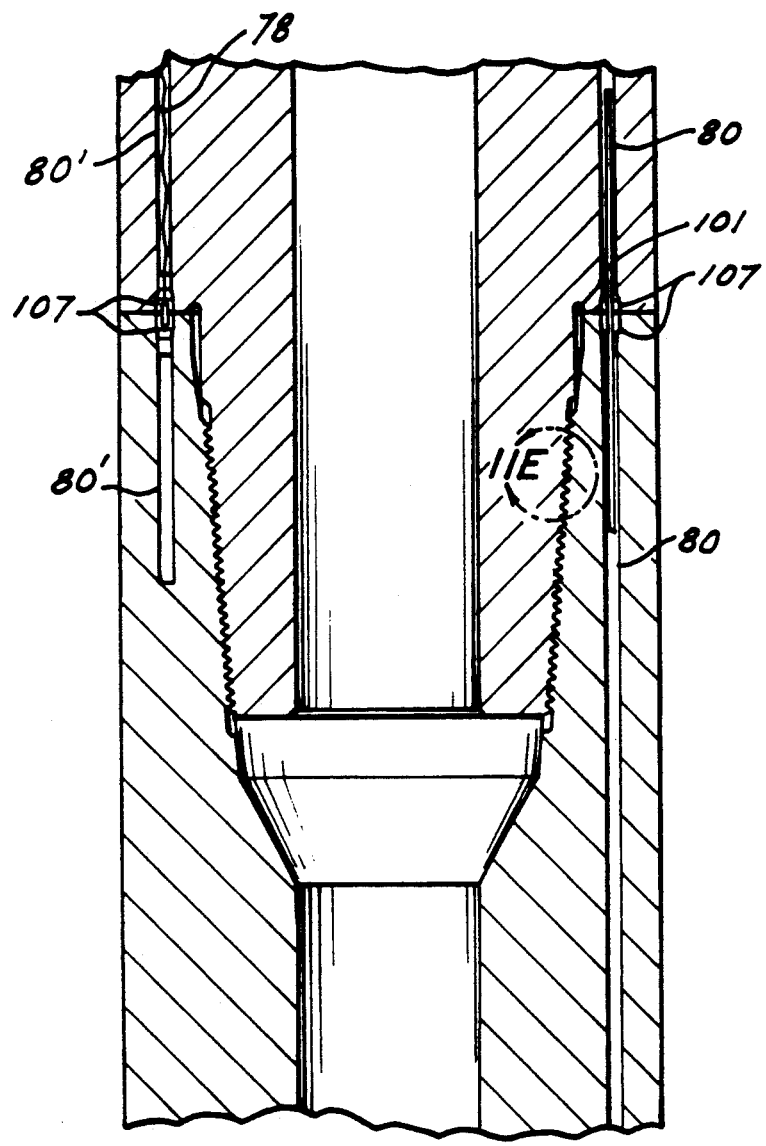
FIG. 11D is a side elevation view, partly in cross-section, showing the tool of FIG. 2 connected to another modular tool.
Figure 11E:
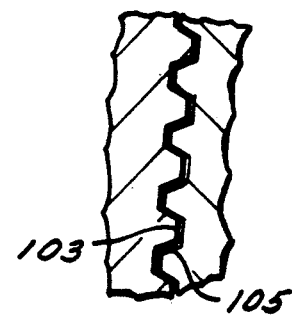
FIG. 11E is an enlarged side elevation view of a portion of FIG. 11D.

As best shown in FIGS. 11 and 11A-E, the modular connection comprises metal ring 86 (see also FIG. 2) which is surrounded on three sides by a cylindrical section of electrically insulating material 88. An adhesive 90 is provided to bond ring 86 to insulator 88. A metal ring 86/insulator 88 assembly 89 is provided in a cylindrical groove 92 in each end of tool 10 and bonded therein by an elastic adhesive (see FIG. 2). The connectors are gauged so that they protrude slightly from the shoulder surface to insure positive electrical contact when the two mating rotary connections are torqued up (see FIG. 11D). As shown in FIGS. 11A-C, a rubber tube 91 is bonded on the assembly 89 and positioned in groove 92 so that the assembly will be preloaded so as to urge assembly 89 outwardly of the end of tool 10 (thus insuring good electrical connection to an adjacent sub as shown in FIG. 11D). As shown in FIG. 11B, insulator 88 includes an integral non-rotation lug 93 which is received in sub 26 for preventing rotation of assembly 89. Also, ring 86 includes an integral non-rotation lug 95 which prevents rotation of ring 86. It will be appreciated that non-rotation of assembly 89 is important in order to prevent breakage of wire 78. Extending from a location in groove 92 is longitudinal bore 80. At the juncture between bore 80 and groove 92 is a connector 94 which effects electrical connection between wire 78 and ring 86.

Referring to FIG. 11D, the pin end of the modular connection has several modifications to a standard API connection. The first is an undercut fillet 101 within the shoulder of the connection. The second is an extended neck 103 on the pin. These two features increase fatigue life and improve the bearing stress distribution along the shoulder of the rotary connection. This improved loading distribution is needed to effect a metal to metal seal and prevent the drilling fluids from coming in contact with the connector assembly.

Lubrication for the modular connection system of this invention is accomplished with the use of a 0.0001 to 0.001 inch thick copper plating (see item 103 in FIG. 11E) and the use of a high shear strength, high temperature, non electrically conductive lubricant 105. The copper plating is applied to the face and threads of the pin connection. The plating is required to prevent galling of the rotary connection when a metal based lubricant (typically used on non magnetic drill collars and components) can not be used (it would short the electrical connector to case).

Both the box connection and pin connection have a circumferential groove 107 located in the shoulder of the connection. The location of the groove is positioned to provide adequate sealing capability against downhole hydrostatic mud pressures while subjected to drilling loads (bending, weight on bit, etc.). Within this groove are the several longitudinally gun drilled holes 80, 80' that receive anti rotational anchors 93 for the electrical connector assembly and also act as a conduit for the bus wire to travel into the junction box located inboard of the sub. These holes are drilled with great locational accuracy to allow for rotary connection rework and/or recuts which will result in intersecting the newly machined connector groove to these holes.

It will thus be appreciated that if either end of tool 10 is damaged, the sub 26 can be cut off to the damage point with a new groove 92 and ring 86 provided at the cut section (along with remachined threading) to permit re-use of the tool.

It will also be appreciated that wire bus 78 is connected to the electronics in hatches 30, 32 and 34 via electrical connectors 96 (FIGS. 4, 8), 98 (FIGS. 4, 9) in junction hatches 58 and 60, respectively. As shown in FIG. 4, bore 80 extends between both junction hatches 58, 60 and modular tool interface hatch 34.

Figure 31A:
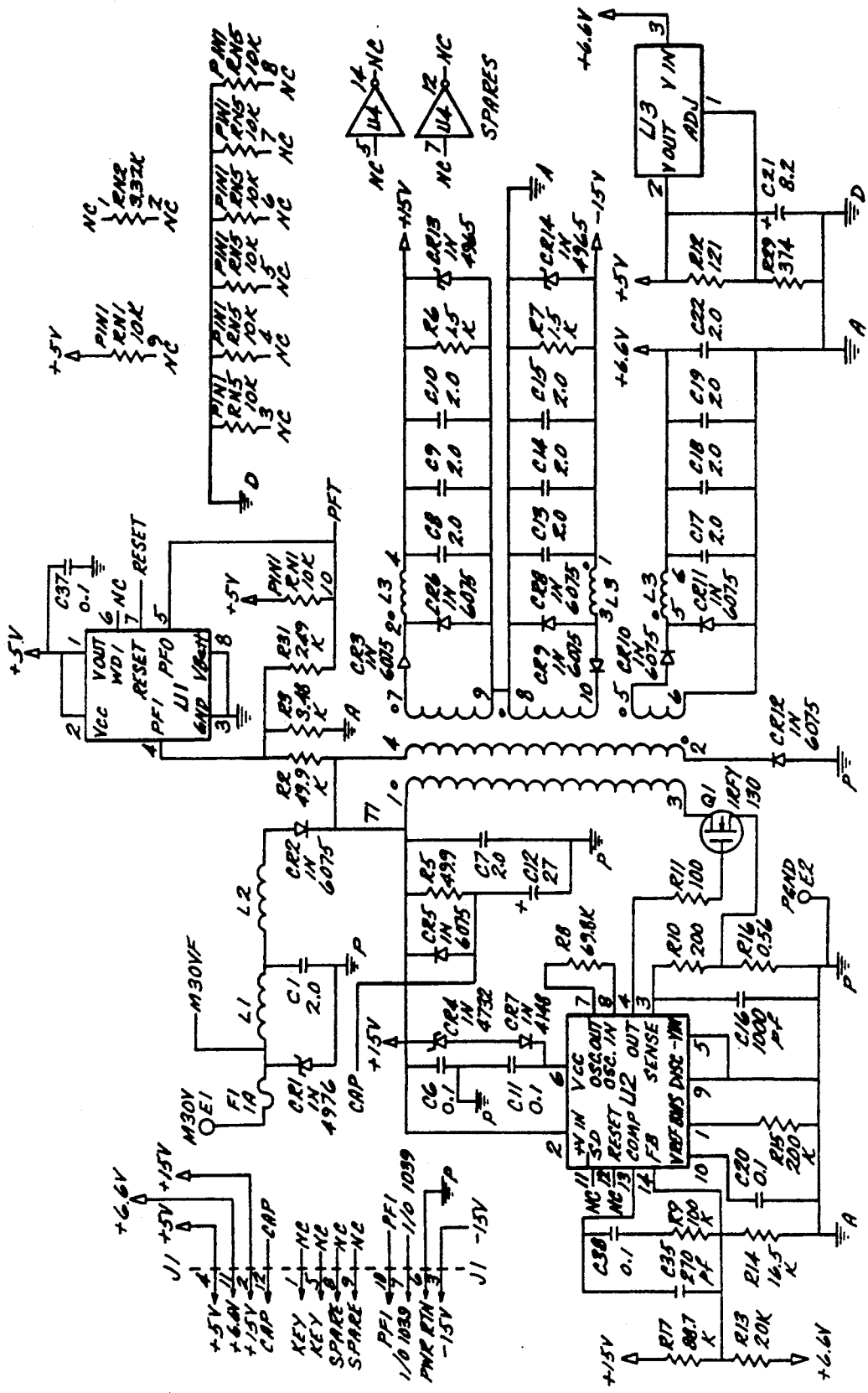
FIGS. 31A-B are electrical schematic diagrams of the electronics in the MTI hatch.
Figure 31B:
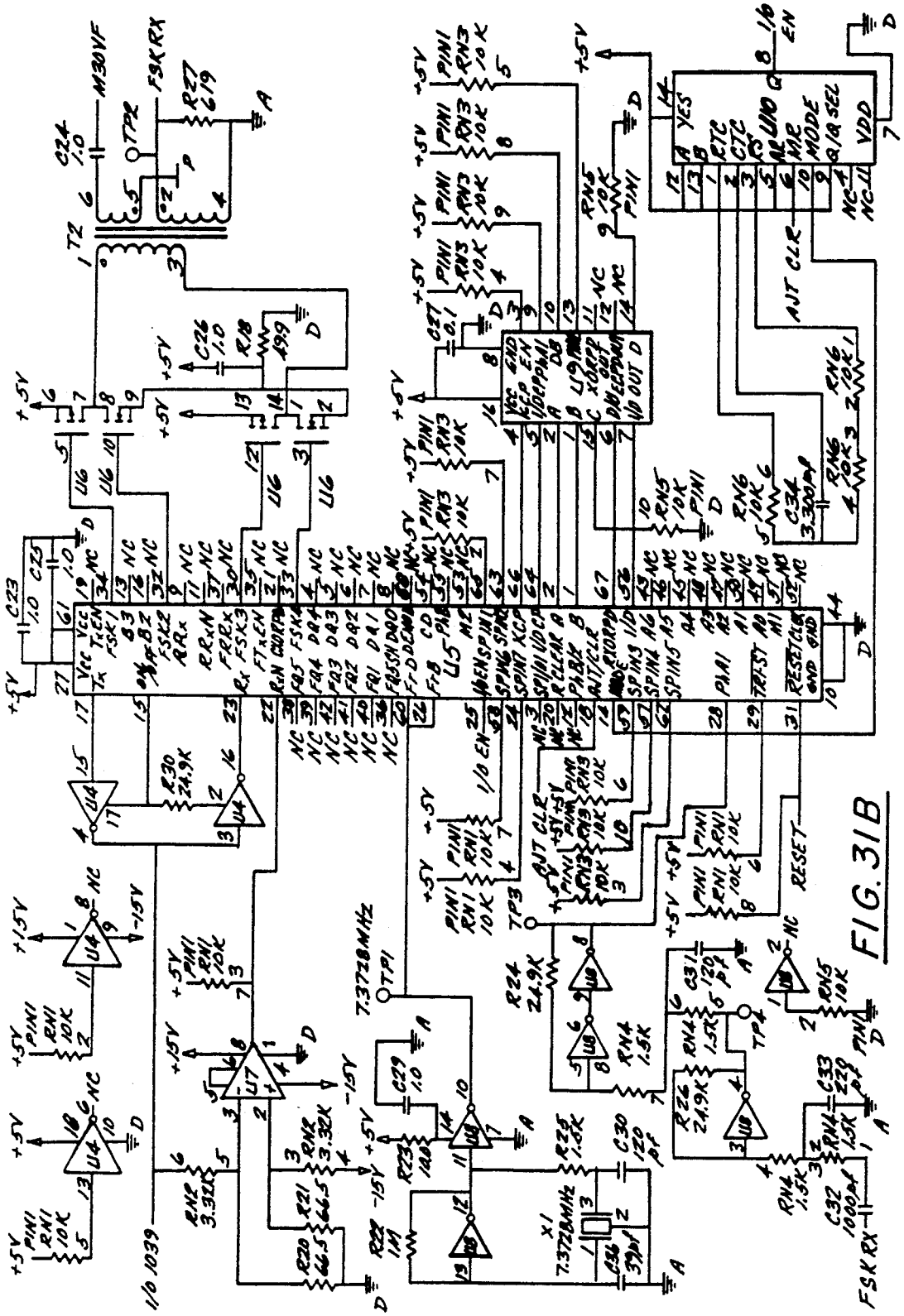

FIG. 5 depicts a system level view of the electronics for the modular neutron porosity tool of this invention. As described above, the electronics have been partitioned so that they fit inside the three hatches 30, 32 and 34. Still referring to FIG. 5, a first function that the modular tool bus fulfills is to supply power to any tool that is connected to the system. A power supply associated with the measurement-while-drilling electronics package (in sub 26 of FIG. 1) produces a nominal 30 volt DC signal which is supplied to the modular tool bus 78. Circuitry inside the modular tool interface (MTI) hatch 34 takes this 30 volt DC signal and converts it into +5 v, +15 v and −15 v supplies. The specific electronic configuration of the power supply/interface circuit or MTI board shown at 100 in FIG. 4 is depicted in the electrical schematic diagrams of FIGS. 31A and 31B. The electronic components in FIGS. 31A-B are identified in Table 1.

A second function of the modular tool bus is to allow bidirectional communication between all members of the bus. A member can be thought of as any intelligent piece of hardware which listens or talks over the bus. Because the bus has multiple members, a software protocol is used which prevents more than one member from talking at the same time. If two members attempted to talk simultaneously, a conflict will occur and most of the communications will probably be corrupted. Thus, when one member is talking, all of the other members must be listening.

The talking and listening functions are implemented over the bus via frequency modulation of a $\frac{1}{2}$ volt peak to peak sine wave. The sine wave is added to the 30 V DC power signal and when observed on an oscilloscope will appear to be riding on a positive 30 volt DC offset. A 273 KHz signal represents a digital "one" and a 245 KHz signal represents a digital "zero". The hardware that encodes and decodes these frequency modulated signals is located inside hatch 34 on the single MTI board 100 the electrical schematic of FIGS. 31A-B. It will thus be appreciated that the MTI board 100 may be considered as a power supply and modem combined into one unit.

TABLE 1

| COMPONENT | DESCRIPTION |
|---|---|
| U1 | Microcontroller Reset Function |
| U2 | High-Voltage Switchmode Controller |
| U3 | Voltage Regulator |
| U4 | Transceiver |
| U5 | Programmable Logic Device |
| U6 | Field Effect Transistor |
| U7 | Voltage Comparator |
| U8 | Inverter |
| U9 | Digital Phase-Locked-Loop Filter |
| U10 | Programmable Timer |

Nuclear Source and Mounting thereof in Tool

Referring now to FIGS. 2, 4, 6–9, and 12–15, the nuclear source and the mounting thereof in tool 10 will now be described. The nuclear source container is shown generally at 102 in FIG. 12. The source container is a rugged unit designed to withstand stresses, pressures and temperatures experienced in downhole oil drilling. It houses a small NRC approved logging source 104 such as Americium 241/Beryllium and adapts it to large downhole hardware by means of a closely controlled diameter, length and thread 106 which secures source 102 to the logging tool and is located on the far right end of container 102. On the opposite end of the thread 106 is a bayonet 110 which is designed to engage and lock the source assembly into the receptacle of an installation and removal tool shown at 112 in FIGS. 14 and 14A. The shank 114 of the threaded end 106 is smaller and thus weaker than bayonet 110 to ensure the successful removal of source 102 from the logging tool. As described below, the novel bayonet design also ensures that no one without compatible equipment will be able to handle the source safely.

Figure 8:
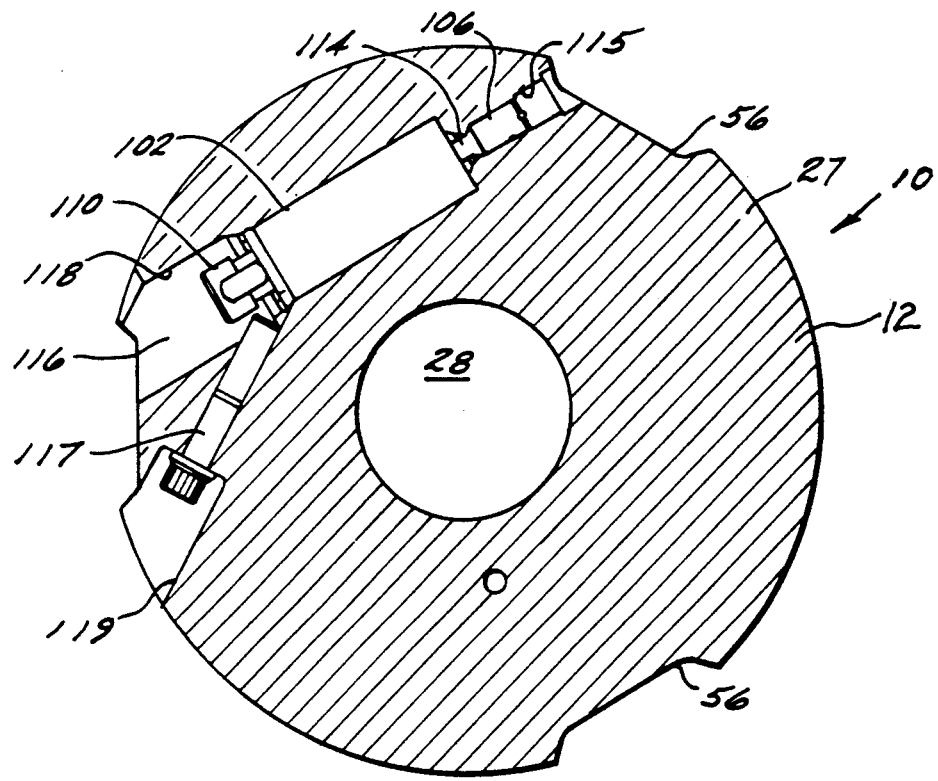
FIG. 8 is a cross sectional elevation view along the line 8—8 of FIG. 2.
Figure 10:
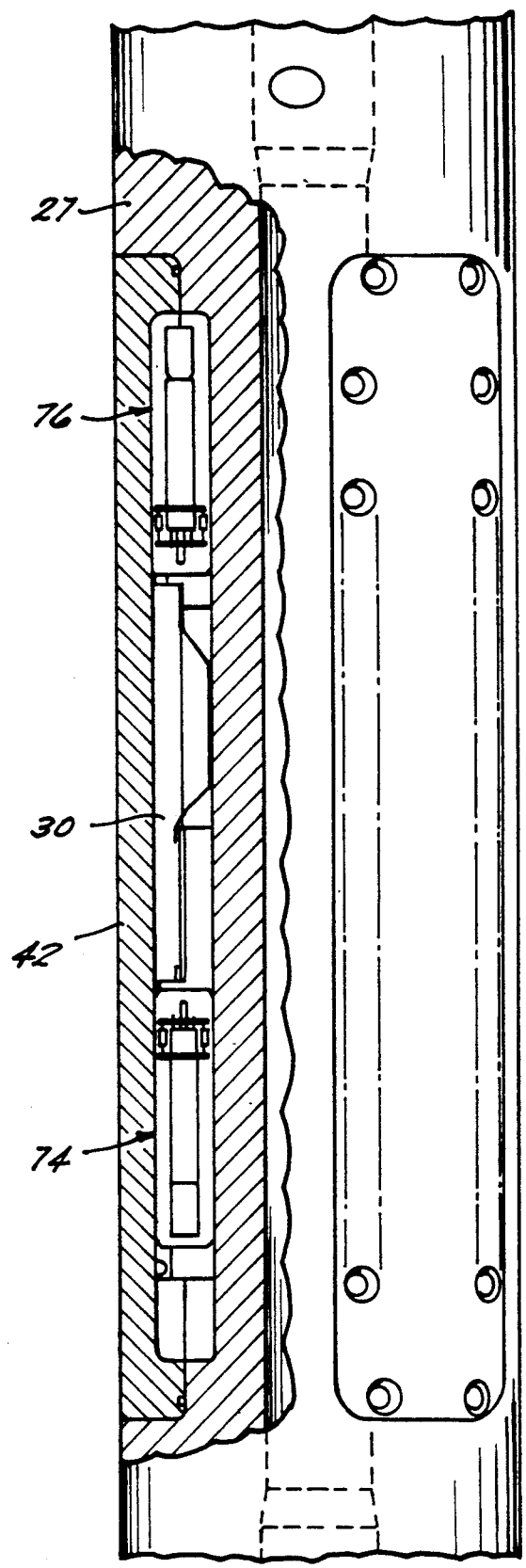
FIG. 10 is a partial sectional view of the tool of FIG. 2.

As best shown in FIG. 8, source 102 is mounted in an opening 116 through the subwall 27. Opening 116 is located on a chord with respect to the outer circumference of tool 10 so that the longitudinal centerline of the radioactive portion of nuclear source 102 will be positioned orthogonal to the longitudinal axis of tool 10 within a section of subwall 27. In this way, the centerline of source 102 will be in alignment or at least nominally (e.g., substantially) aligned with the axis of the detectors 74 and 76. Opening 116 includes a larger diameter portion 118 which is sized to receive the head of installation and extraction tool 112 and a smaller diameter section 115 having internal threading for threadible engagement with threaded end 106 of source 102. Source 102 thus relies on elastic strain (due to torque) of the threaded end 106 as the primary means for securement to subwall 27. As a back-up measure, a bolt 117 is provided through an opening 119 (which runs from the outer wall of sub 12 and intersects opening 116) and abuts against the exterior end of source 102 for further securing retention in sub 27.

As is clear from FIG. 8, source 102 is secured such that it is open to the mud environment but not subjected to mud flow. The mounting of source 102 in subwall 27 allows for quick and easy removal from the tool, particularly in the event of an emergency. Also, the positioning of the source along the centerline of the tool provides optimizes neutron emission into the formation.

Figure 14A:
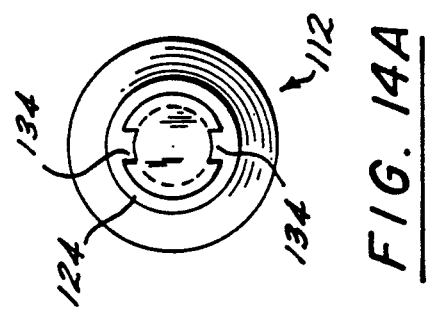
FIG. 14A is an end view along the line 14A—14A of FIG. 14.
Figure 14:
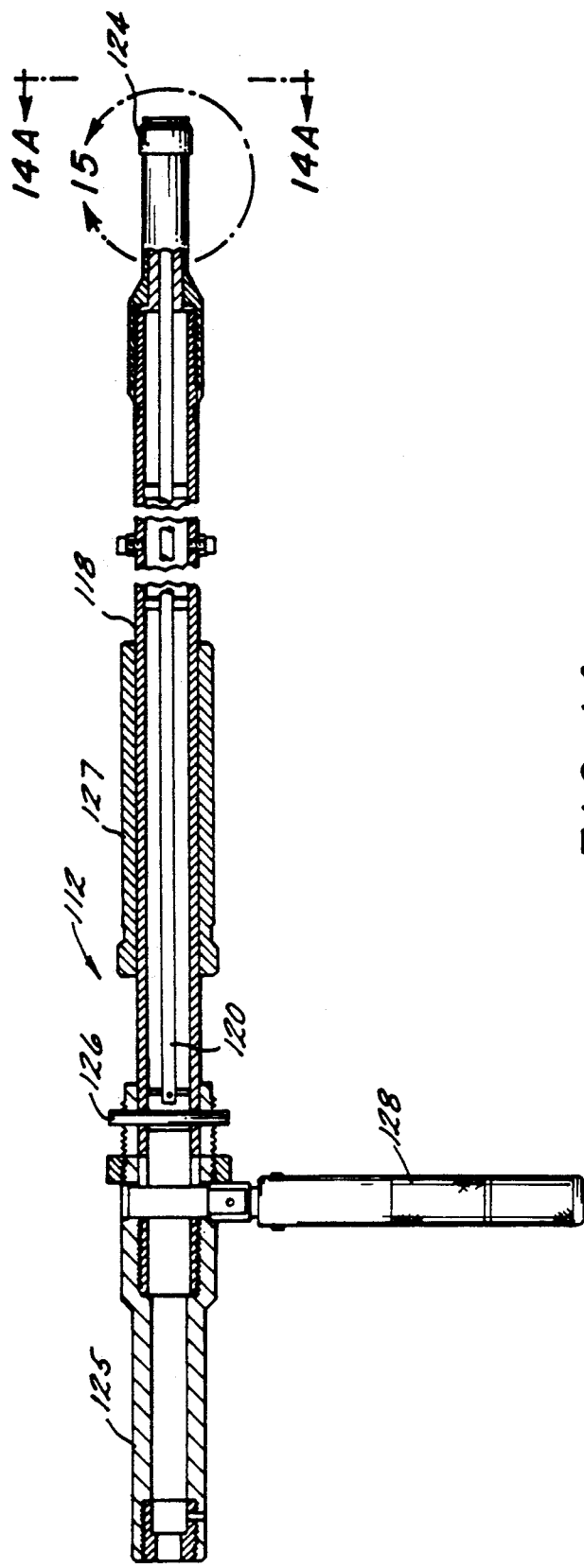
FIG. 14 is a cross-sectional elevation view of a nuclear source handling tool in accordance with this invention.

Referring to FIGS. 14 and 14A, nuclear source loading tool 112 comprises an inner tube 118 having a spring actuated rod 120 therein. Rod 120 is biased at one end by a spring 122 and terminates at a bayonet 124. A locking pin 126 may be positioned through the center of rod 120 and tube 118. In addition, tool 112 includes a pair of handles 125 and 127 which are colinear with inner tube 118. Finally, a pre-set torque wrench 128 is attached to tube 118 so that when locking pin 126 locks rod 120 to tube 118, wrench 128 will rotate both tube 118 and rod 120 to torque source container 102 (which has been attached to bayonet 124) to a preselected torque value.

Figure 15:
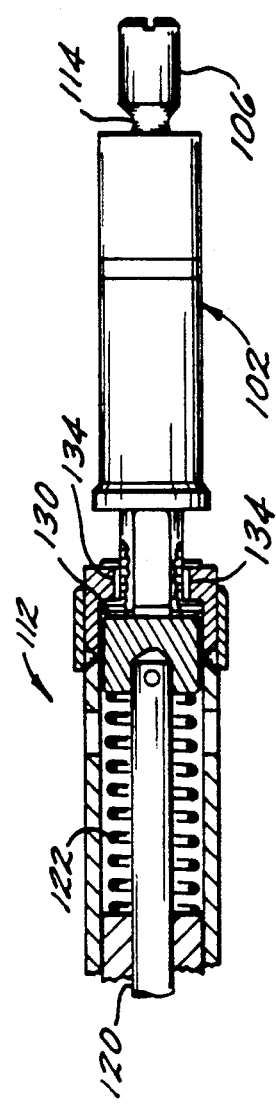
FIG. 15 is an enlarged view depicting the source container of FIG. 12 detachably connected to the handling tool of FIG. 14.
Figure 16:
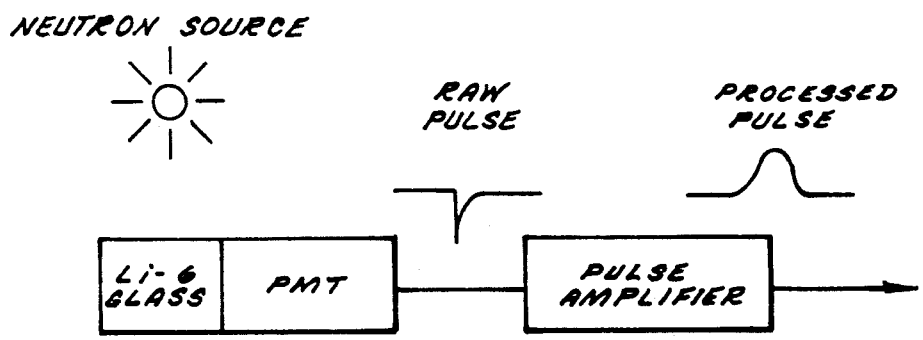
FIG. 16 is a diagrammatic view of the electronics and pulse forms associated with the near and far detectors.

As best shown in FIGS. 13, 14A and 15, the end of bayonet 110 includes a circular shoulder 130 having a pair of opposed slots 132 therein. Bayonet 124 has a complimentary pair of opposed tangs 134 which are sized so as to be received in slots 132. As the tangs 134 are received in slots 132, the spring 122 is biased and tool 112 is rotated clockwise or counterclockwise so that tangs 134 are held tightly by shoulder 130.

Neutron Detectors

Figure 17:
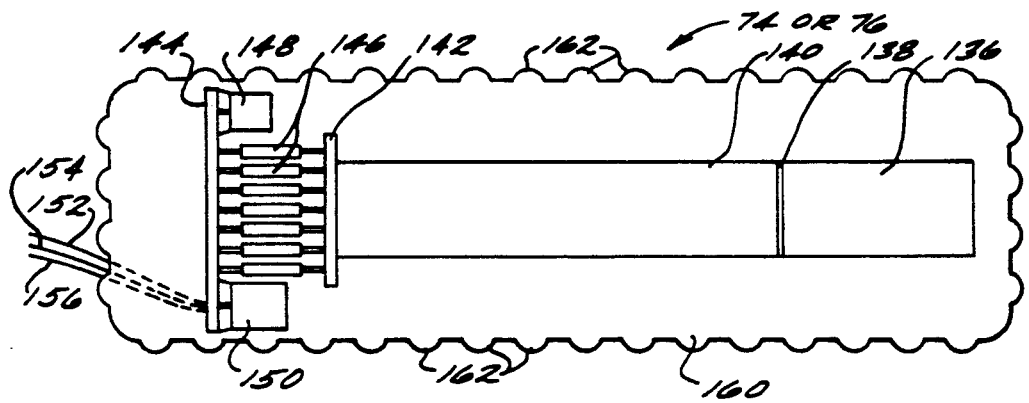
FIG. 17 is a cross-sectional view of a detector assembly.

Referring to FIGS. 4, 10, 16 and 17, the "near" and "far" neutron detectors 74 and 76, respectively are positioned in detector hatch 30. Each detector 74, 76 consists of a piece of $Li^6$ enriched scintillating glass 136 configured as a one inch long cylinder having a $\frac{1}{2}''$ diameter, which is bonded by an adhesive layer 138 to a photomultiplier 140 of comparable diameter. Alternatively, scintillator 136 may contain $Li^6$ in the form of $Li^6I$ crystal. Photomultiplier tube 140 terminates at a first circuit board 142. A second circuit board 144 is spaced from circuit board 142 with an array of resistors 146 connected between circuit boards 142 and 144. A pair of capacitors 148 and 150 are also positioned on circuit board 144. The array of resistors plus the capacitors are a voltage divider network intended to provide voltages to the various electrodes of the photomultiplier. Three wires 152, 154 and 156 terminate at circuit board 144 with wire 152 being connected to a high voltage source 158 (FIG. 4) in hatch 34 (FIG. 5); and wires 154, 156 being connected to the processor board in hatch 32 (FIG. 5). Each detector assembly 74, 76 is potted in a suitable potting compound 160 such as a silicone rubber compound (FIG. 17). Potting compound 160 has a plurality of ribs 162 molded therein to provide for expansion and shock absorption.

Neutrons and gamma rays traverse glass 136 producing light scintillations which are converted by the photomultiplier (PMT) 140 into voltage pulses of various heights. A pulse height analyzer circuit then produces a spectrum of the type shown in FIG. 18. This spectrum is then subjected to further analysis in order to subtract out the gamma-ray portion. A ratio is then taken of the net neutron counts in the near detector to that in the far detector. This ratio, based on a previous calibration in the laboratory, can then be related to a porosity provided the nature of the rock matrix is known.

The electronic pulse that is generated by the scintillator/PMT is of little use until it undergoes some analog signal processing. The amplitude of the pulse is typically quite low and it has a very short duration. By amplifying the pulse and passing it through a low pass filter, the raw pulse is modified into a form whose amplitude is more easily measured. (See FIG. 16 for a graphic representation of the pulse shape after passing through pulse amplifier).

Figure 18:
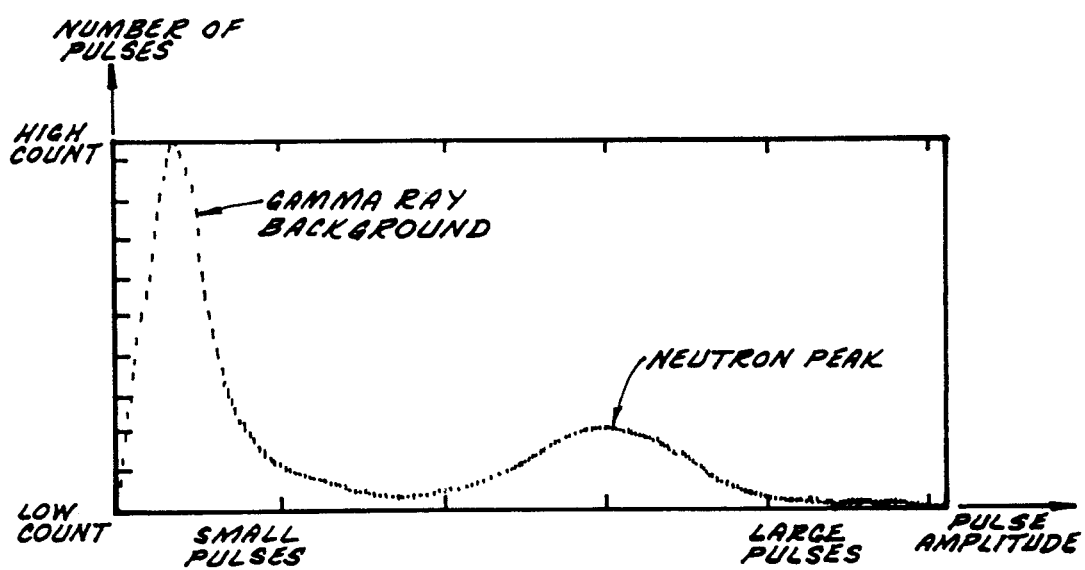
FIG. 18 is a typical spectrum for an $Li^6$ glass scintillator.

As mentioned, a typical spectrum for Li-6 glass is shown in FIG. 18. The vertical axis gives the quantity of pulses and the horizontal axis is proportional to the pulse amplitude. Examination of this spectrum shows that it depicts two parts, namely the gamma-ray background and the neutron peak. The gamma-ray portion occurs because $Li^6$ glass is also sensitive to gamma rays, which are always present in a neutron logging situation. The neutron peak is predominantly caused by thermal neutrons interacting with the glass scintillator.

Heretofore, it has been believed by those skilled in the art that $Li^6$ glass (or other $Li^6$ detectors) would be problematic in a logging measurement because of the difficulty of removing the gamma-ray background. The present invention has overcome past practical problems by acquiring real time spectra and subjecting these spectra to digital processing techniques.

Figure 19A:
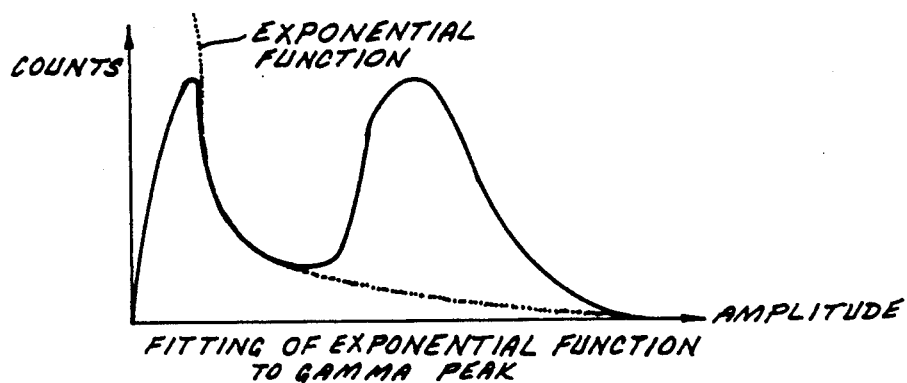
FIG. 19A is a graph depicting the fitting of an exponential function to the gamma-ray portion of the spectrum of FIG. 18.

As will be discussed in greater detail below, after a spectrum has been acquired, a microprocessor will fit an exponential curve to the spectrum so that it approximates the portion of the spectrum contributed by the gamma rays. A typical exponential function is shown superimposed on a raw spectrum in FIG. 19A. After the gamma characterization is done, it becomes possible to strip the gamma rays out of the raw spectrum. This is accomplished by subtracting the gamma function from the raw spectrum.

Figure 19B:
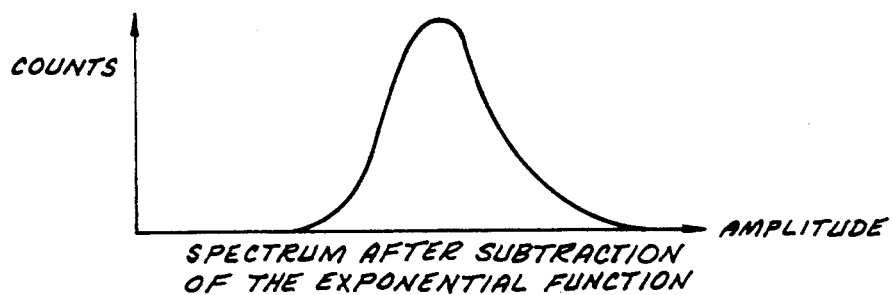
FIG. 19B is a graph depicting the spectrum of FIG. 18 subsequent to subtraction of the exponential function in accordance with the gamma-stripping technique of the present invention.

The result of this subtraction is shown in FIG. 19B. Note that the gamma-ray background is now absent and the spectrum contains counts that are due only to neutrons. If the microprocessor integrates the counts under the neutron peak, then the resulting summation will yield the total number of neutrons in the spectrum. It should be noted here that the gross neutron count is not the same value as the neutron count rate. The neutron count rate is calculated by dividing the gross neutron count by the time over which a spectrum is collected. This calculation will produce a value whose units are neutrons per second.

It will be appreciated that while two detector assemblies are preferred, this invention may also be utilized in conjunction with one detector assembly or greater than two detector assemblies.

Neutron Detector Hatch Electronics

Figure 21:
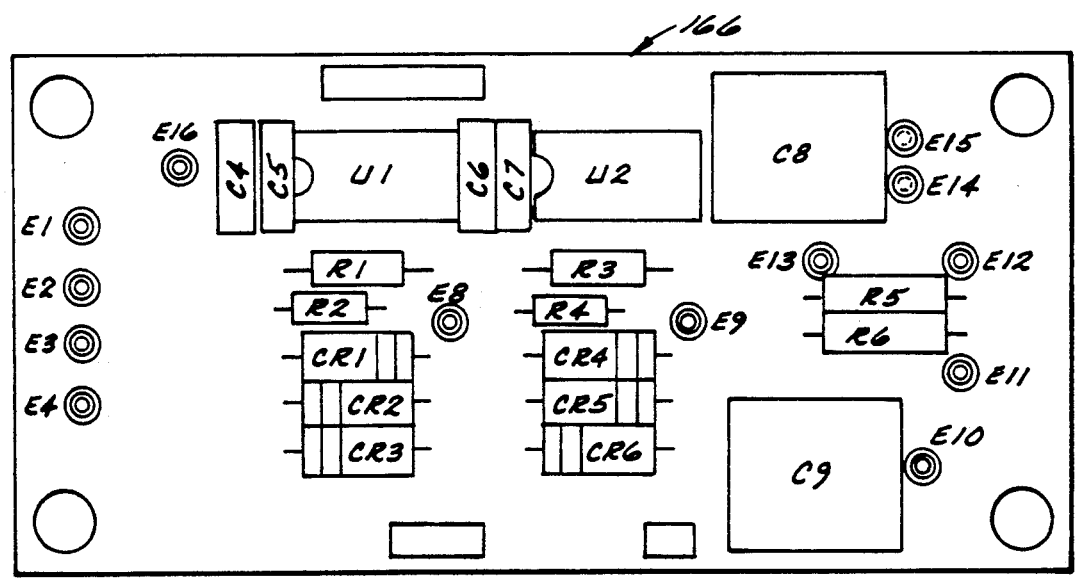
FIG. 21 is a diagrammatic plan view of a circuit board for the detector electronics.
Figure 20:
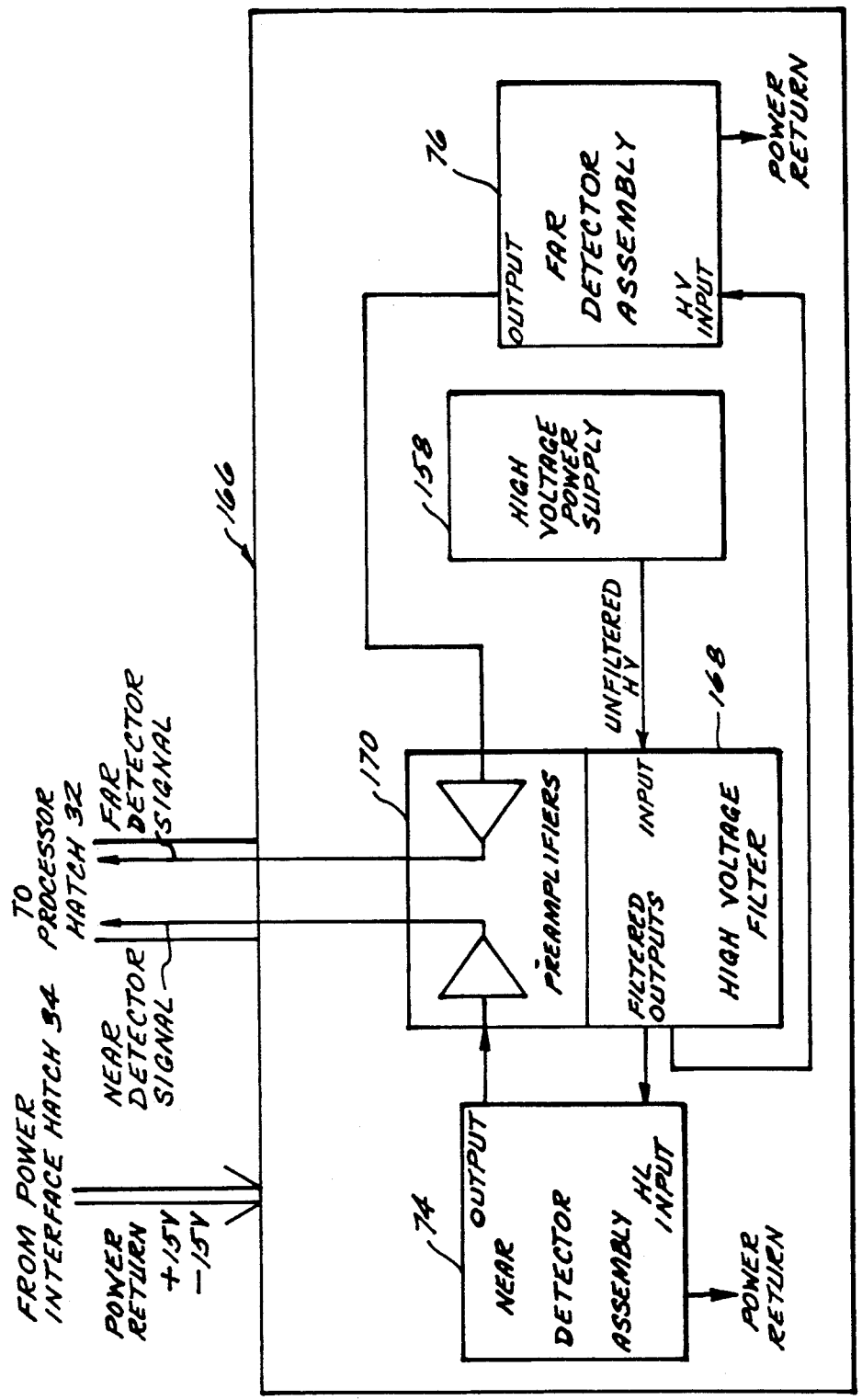
FIG. 20 is a block diagram of the detector hatch electronics depicted in FIG. 4.
Figure 22:
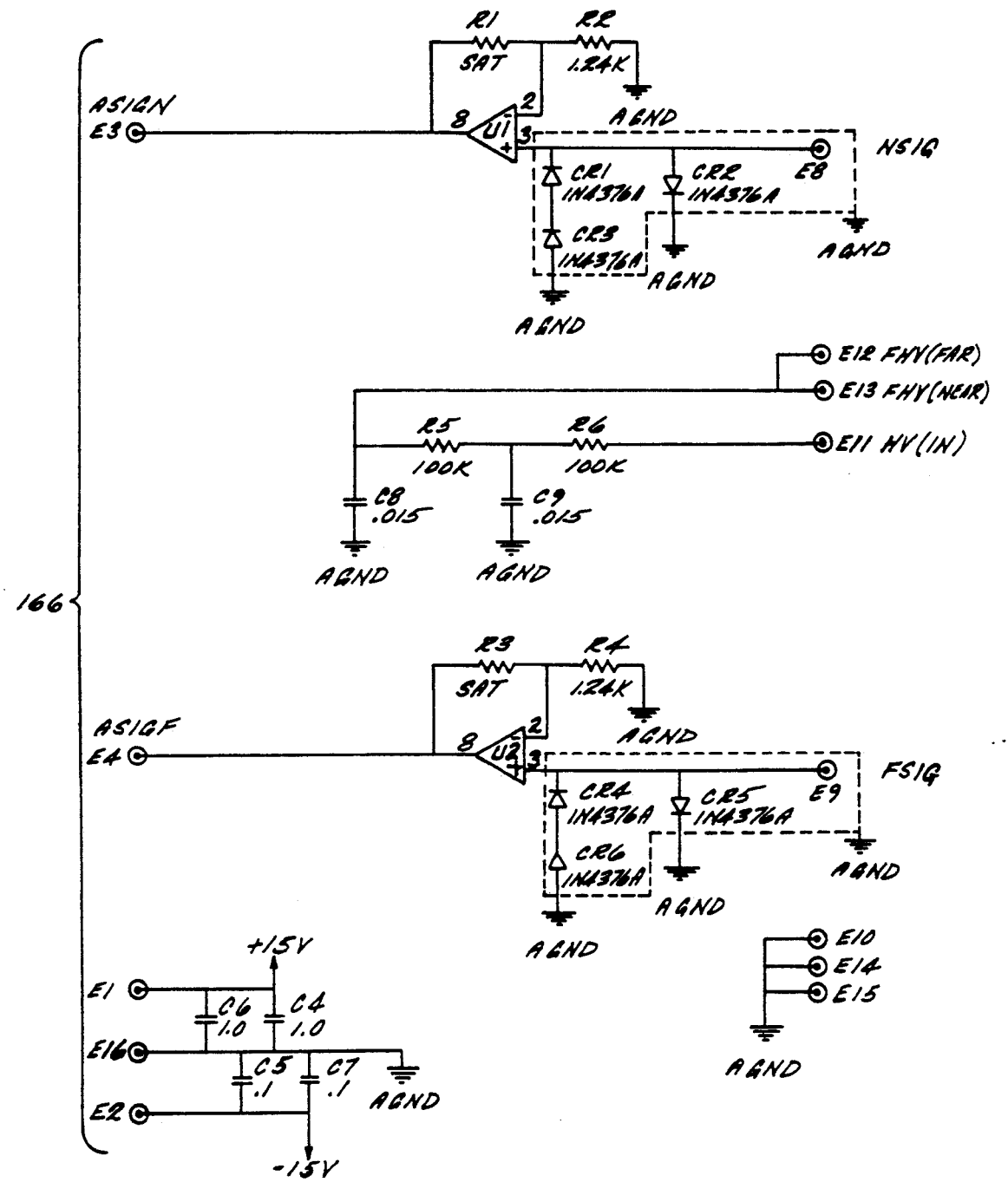
FIG. 22 is an electrical schematic of the circuit board of FIG. 21.

FIG. 20 is a block diagram of the electronics associated with the detector hatch 30 and positioned on circuit board 166 shown in FIGS. 4 and 21, and in the electrical schematic of FIG. 22. All of the electronic components depicted on FIGS. 21 and 22 are identified in FIG. 22 (with components U1 and U2 comprising operational amplifiers). Note that the near and far detector assemblies are so named because of their distance from the neutron source. Each detector has been configured so that it requires only three connections to make it operational. By applying 1.5 KV DC to its high voltage input and grounding the power return, pulses will then appear on the output terminal.

Figure 23A:
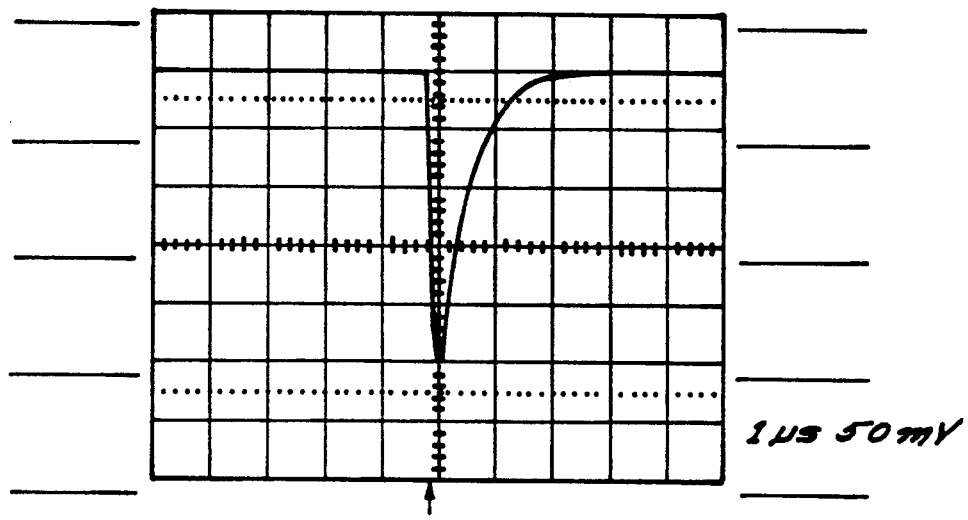
FIG. 23A is a graph showing a typical neutron detector output pulse.

When no neutrons or gamma rays are present, a detector 74, 76 (FIG. 10) will be in a quiescent state and output signal should be resting close to a ground level. If a neutron or gamma flux is present, random negative pulses will be observed at the detector's output. FIG. 23A depicts a typical output pulse. Most detectors will produce an amplitude distribution that starts at zero and ends with a maximum of approximately one volt.

The 1.5 KV DC that is needed to operate the detectors is supplied by the previously discussed high voltage power supply 158 (FIG. 20). This supply uses +15 V as its input and produces the fixed high voltage needed by the system. The output of the HVPS (High Voltage Power Supply) cannot be used directly by the photomultipliers because it contains approximately one volt of peak to peak noise. If high frequency noise is present on the high voltage input of a photomultiplier, it will couple directly into the output. This problem is eliminated by first passing the noisy high voltage through a low pass filter 168 (FIG. 20). Filter 168 removes the unwanted noise and clean high voltage is distributed to both detectors 74, 76.

The circuit board 166 (FIG. 4) which contains the HV filter 168 also contains two preamplifiers 170 that are used to adjust the signal gain from the near and far detectors. The gain of photomultiplier tubes 140 usually varies between units and thus requires a hardware gain normalization when initially setting up the system. This gain adjustment assures that the neutron peak occurs in the proper position in the spectra.

A second benefit of the preamplifiers is that they present a high input impedance to detectors 74, 76. This is important because the detectors have a very weak load driving capacity and do not work very well when driving long signal lines or heavy loads. Thus, by placing the preamplifiers 170 close to the detectors, signal distortion is minimized and the preamplifiers drive the required loads.

It will be appreciated that FIG. 20 shows the HVPS 158 as being located in the detector hatch. Technically this is incorrect because it is actually located inside the MTI hatch 34 (FIG. 4). This simplification was taken to help make the detector hatch electronics more understandable.

Processor Hatch Electronics

Figure 24:
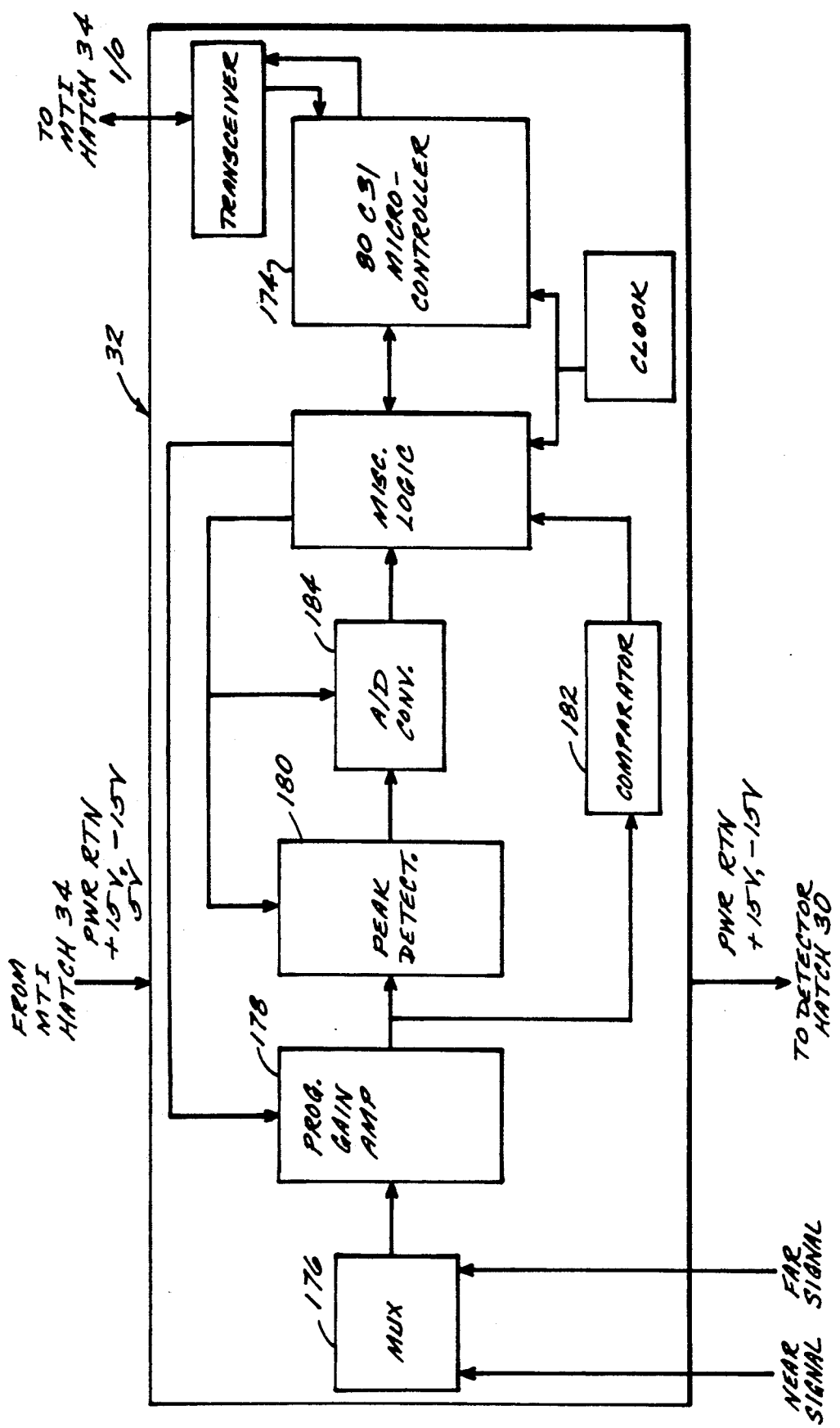
FIG. 24 is a block diagram depicting the processor hatch electronics.
Figure 25A:
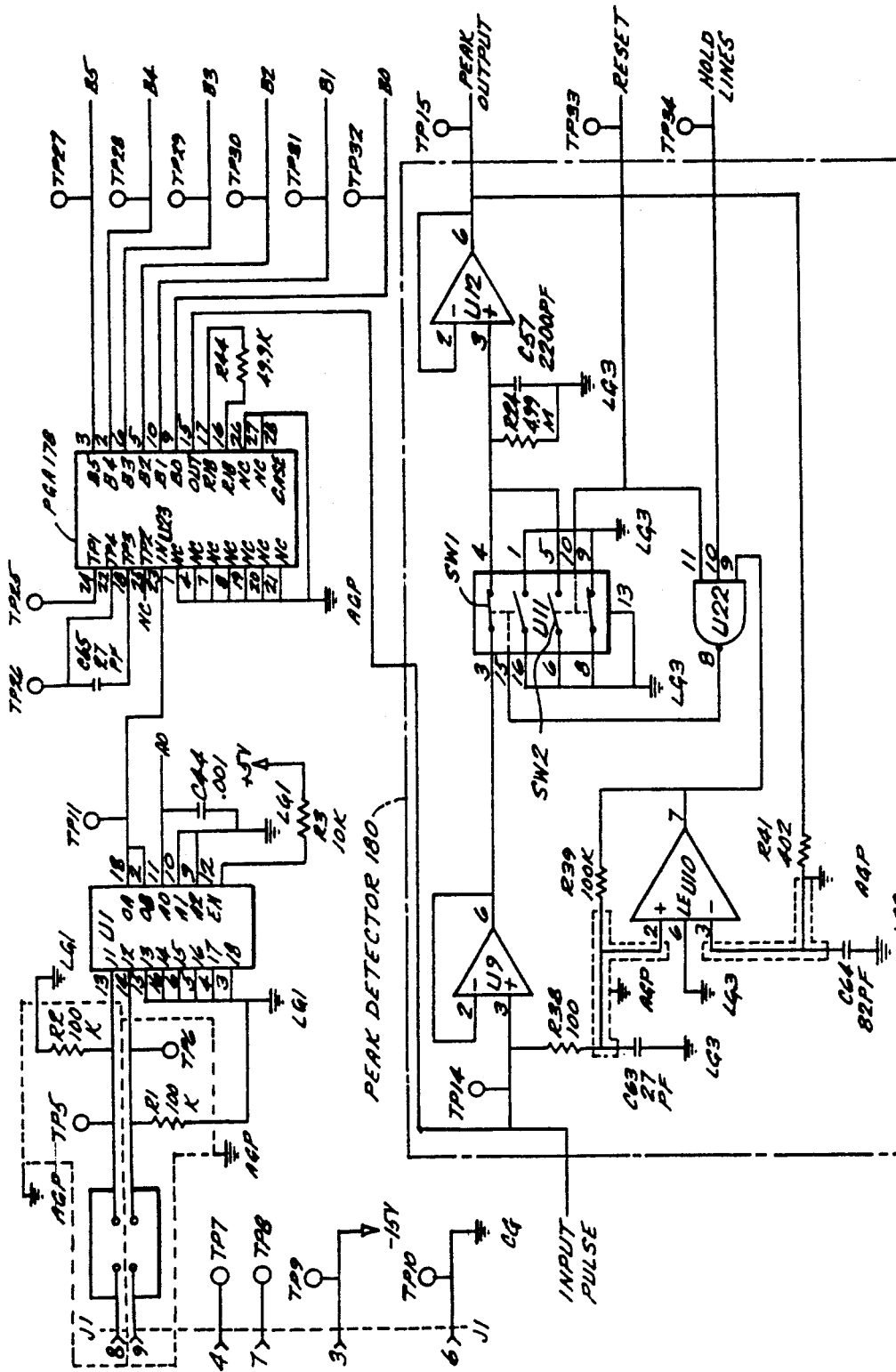
FIGS. 25A-C are electrical schematic diagrams of the processor hatch electronics.
Figure 25B:
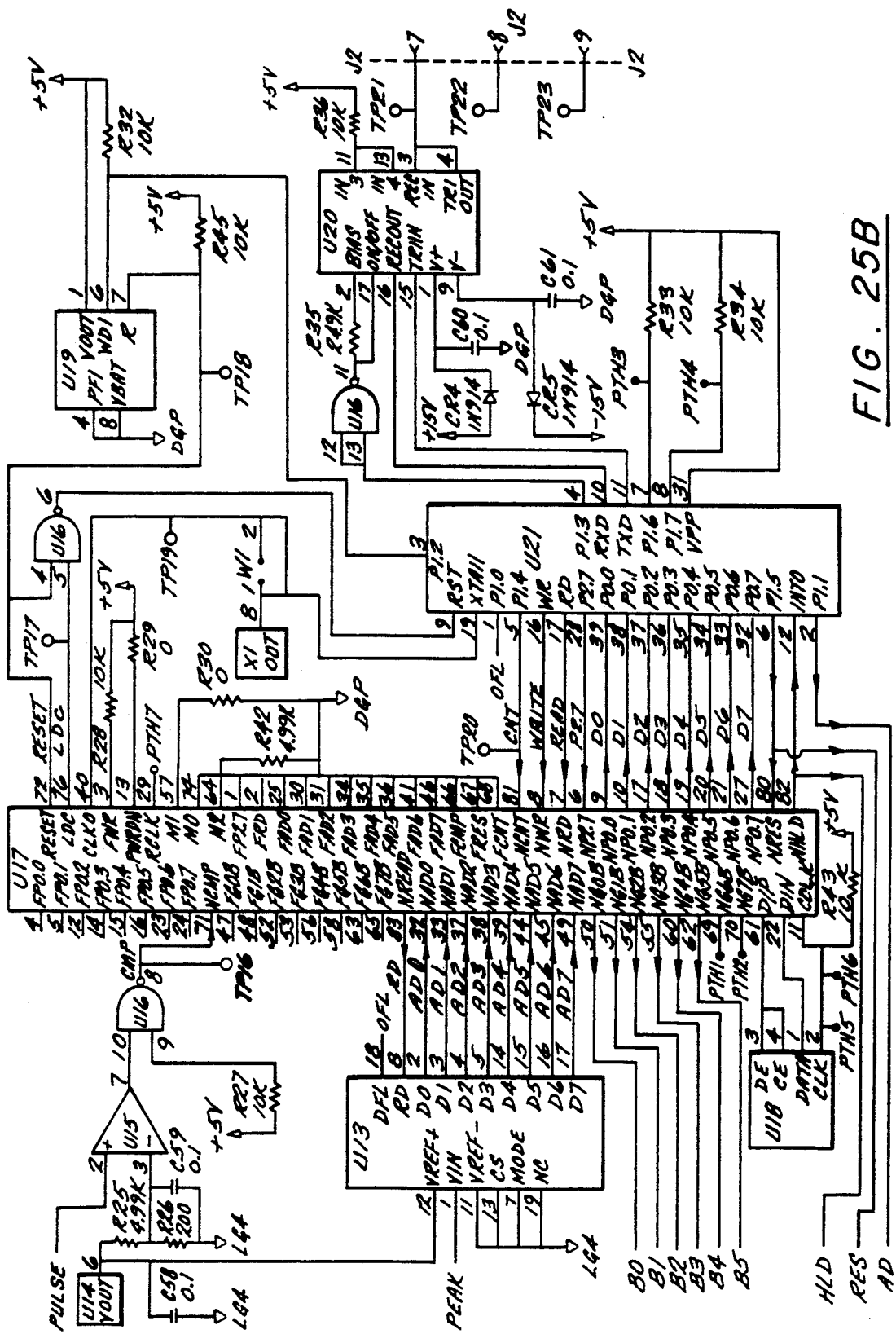
Figure 25C:
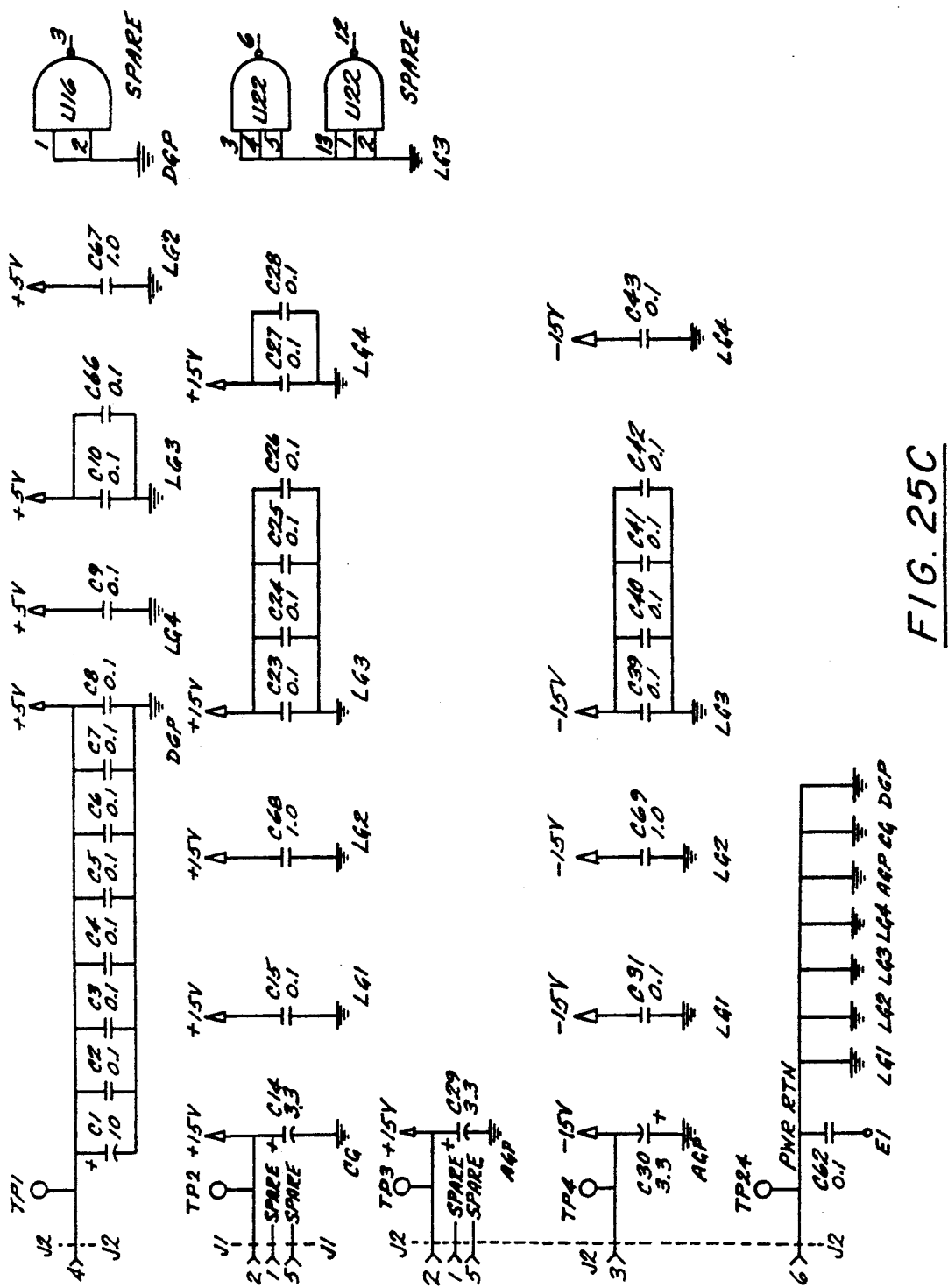

FIG. 24 shows a block diagram of the electronics located inside the processor hatch 32. These electronics are located on a processor board 172 shown in FIG. 4 and in the electrical schematics of FIGS. 25A-C. Individual electronic components depicted on FIGS. 25A-C are identified in Table 2. This electronics acquires spectra from the detectors 74, 76 and then process the spectra to produce detector count rates. An 80C31 microcontroller module 174 (FIG. 24) is used to perform all functions that require computations and communications with devices outside the tool.

Figure 26:
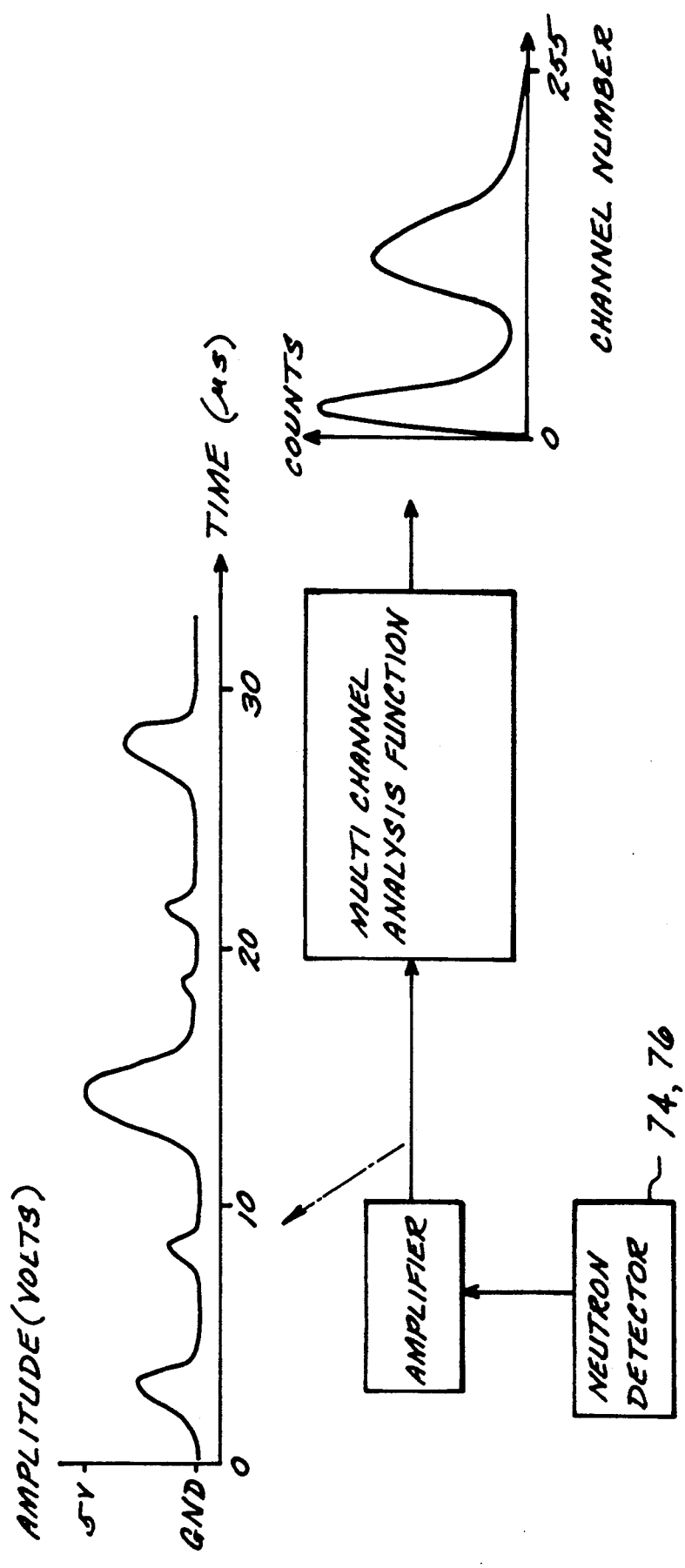
FIG. 26 is a diagrammatic view depicting the multichannel analysis function of the present invention.

From a nuclear electronics standpoint, this circuitry implements a function known as multichannel analysis. The input and output of this function is shown in FIG. 26. The input consists of a train of analog pulses, each corresponding to the absorption of a neutron or gamma-ray by the detector. The function observes the amplifier output for a pre-selected length of time (e.g. 30 seconds) and constructs a pulse height distribution.

The channel number is the means by which the amplitude of a given pulse is described by this function. The channel numbers start at zero and end with a maximum value determined by the resolution of the system. In a preferred embodiment, the system has eight bits of resolution which means that the channel numbers start at zero and reach a maximum value of 255. Each channel can be thought of as having its own counter which is incremented when a pulse falls into a given channel. Thus, the smallest pulses are counted in channel zero and the largest pulses are counted in channel 255.

Returning to FIG. 24, it can be seen that the near and far detector signals enter the processor board through an analog multiplexer 176. The multiplexer is necessary because MCA (Multichannel Analyzer) can acquire spectra on only one detector at a time. This limitation is solved by multiplexing the near and far signals into the single MCA on the board. A drawback of this multiplexing scheme is that some counts in the unused channel are lost while it sits idle.

During a typical down hole acquisition cycle that lasts approximately 30 seconds, the MCA will spend unequal amounts of time on the near and far detectors. The acquisitions are interleaved by spending 1 s and 5 s on the near and far detectors, respectively. This 17%, 83% duty cycle is then repeated until the allocated 30 seconds of collection time has elapsed.

The near and far detector signals get unequal collection times due to their inherently different count rates. Since the near count rate is much greater than the far count rate, it is quite easy to get good statistics on the near channel. Conversely, the low count rates on the far detector requires that most of the MCA's collection time be spent on that channel to get acceptable statistics.

The next functional block in the system is a novel programmable gain amplifier (PGA) 178 (FIG. 24). This is an amplifier whose gain can be controlled digitally. Besides amplifying detector pulses PGA 178 also modifies the frequency characteristics of signals that enter it. Pulses that are presented to the PGA have the same shapes as that shown in FIG. 23A. In this case, however, the amplitude distribution will now range from zero to approximately −10 volts because of the gain contributed by the preamplifier.

Figure 23B:
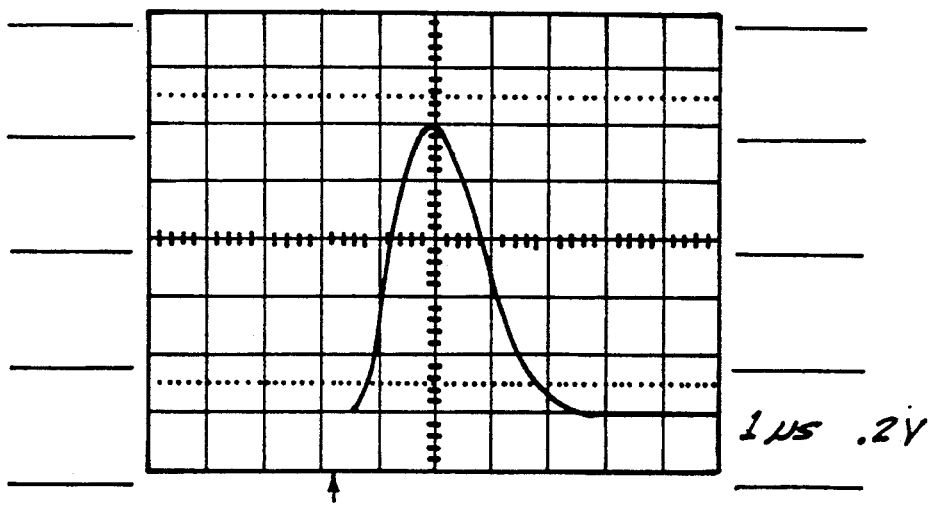
FIG. 23B is a graph depicting a typical programmable gain amplifier output pulse.

FIG. 23B shows a typical PGA 178 output pulse. Note that the pulse is still unipolar but that it is now a positive signal. Another important feature of this pulse is that it is much more gently rounded than the waveform shown in FIG. 23A. The shape of the input waveform has been modified by subjecting it to a low pass filter. This attenuates the high frequency signal content of each pulse and thus accounts for the more gentle waveform at the PGA output.

There are two important reasons to include a low pass filter function in the PGA. By limiting the high frequency signal content in each pulse, the signal to noise ratio will be significantly improved and the system resolution preserved. All photomultipliers produce some high frequency noise and inclusion of the filter function helps the MCA place a pulse in the correct channel.

The second important benefit of the filtering relates to the shape of the output waveform. If a comparison is made of FIGS. 23A and 23B, it can be seen that the peak amplitude of the first waveform would be very difficult to measure because it only lasts for a few nanoseconds. The second waveform, however, has a peak amplitude that lasts much longer and would therefore be much easier to measure. The ability to precisely quantify pulse amplitudes is an important feature of this invention as it will have a serious impact on the quality of spectra collected by tool 10.

The gain stage of the PGA has an analog range of zero to 5 that is controlled with 6 bits of resolution. When the tool is initially powered up, the gain stage is set to 2.3 and a short acquisition cycle is done on each detector to locate the neutron peaks. At the time of tool assembly the preamplifier gains are set such that the neutron peak for both detectors will occur at channel 140 to 160 with the PGA at the default gain of 2.3. By placing the neutron peaks within these limits, (at room temperature) the tool will always be able to locate the neutron peak of each detector under elevated temperature conditions.

Prior to the start of the first real 30 second acquisition cycle, the gain of the PGA is adjusted to place the neutron peak between channels 90 and 110. The neutron peak is kept stabilized within these limits to help the processing algorithm produce accurate neutron count rates. Keep in mind that each time the microcontroller switches detectors, the current PGA gain (for the chosen detector) must be written to the PGA.

It is possible to place the neutron peak in a known position since the microcontroller knows the current PGA gain and current peak location. By the use of a simple formula, a new PGA gain can be calculated and used to drive the neutron peak into the desired limits. Just before the start of each new 30 second acquisition cycle, the neutron peak locations are checked using spectra from the previous 30 second cycle. If either neutron peak is not within the correct limits a new PGA gain will be calculated and used during the upcoming 30 second cycle.

Figure 27:
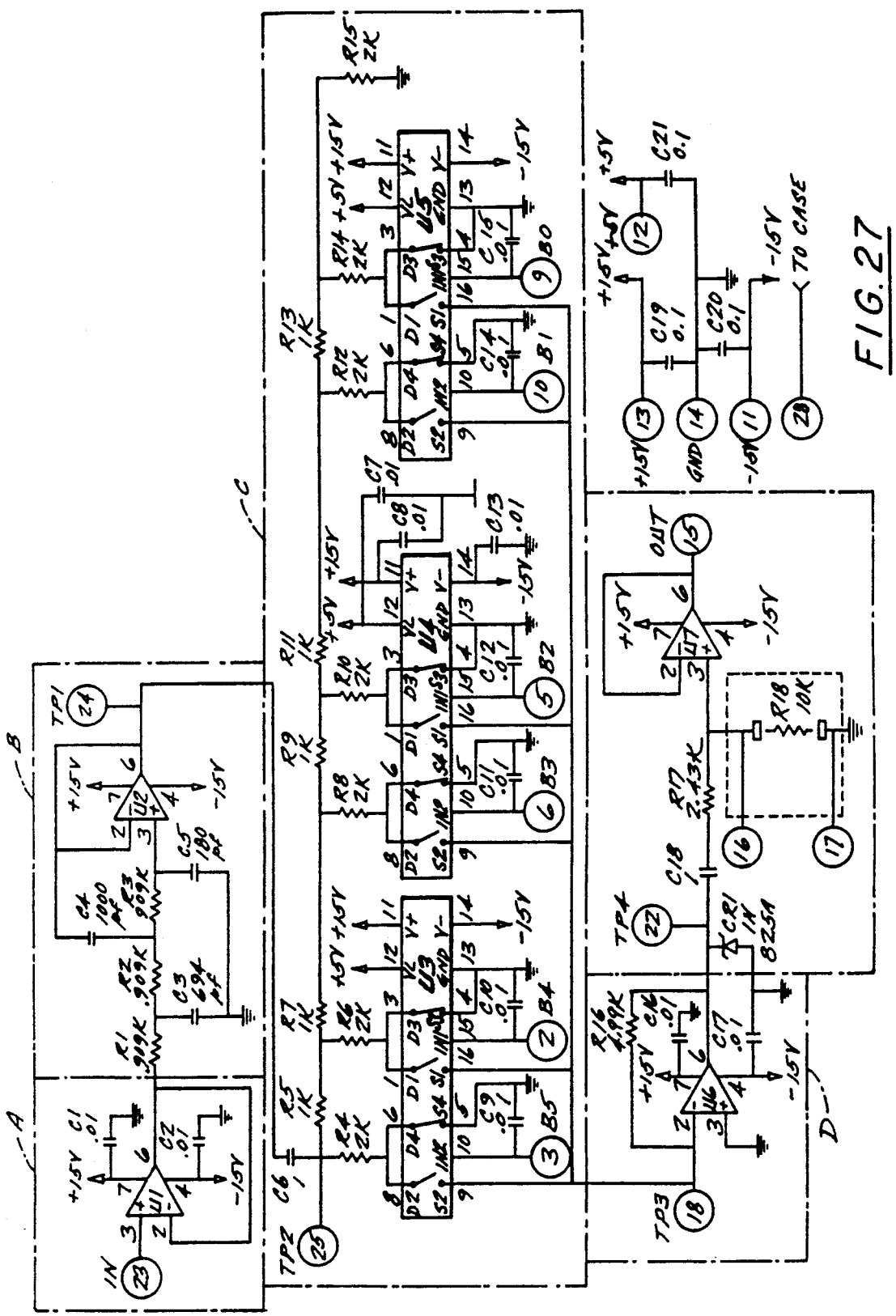
FIG. 27 is an electrical schematic of the programmable gain amplifier used in accordance with the present invention.

Referring now to FIG. 27, the specific circuitry of PGA 178 will be described. PGA 178 unites several functional sections into a single system. The input to PGA 178 is shown in FIG. 27, Section A. U1 is configured as a non-inverting voltage follower that provides unity gain. This gives PGA 178 a high impedance input that will not distort the output of the preamplifier driving the PGA.

FIG. 27, Section B, shows the low pass filter of the PGA. This is a third order Bessel filter that has a cutoff frequency of 250 KHz. A low pass filter is used to attenuate the frequencies above 250 KHz in an input pulse. By limiting the high frequency signal content of an input pulse, the signal to noise ratio of the system is improved. This results in a more gently rounded waveform at the output of the low pass filter. The Bessel type function was chosen over other filter functions because of a special property it exhibits. This filter has a linear phase shift for most input frequencies which means that a unipolar input pulse causes a unipolar output pulse. Most other low pass filters will convert a unipolar input into a bipolar output. A bipolar output pulse is undesirable because it increases the deadtime of the system.

The gain of PGA 178 is determined by Sections C and D. Section C can be modeled as an equivalent resistor feeding the summing junction of U6 (FIG. 27). B5, B4, B3, B2, B1 and B0 are the digital inputs that set the resistive network to a specific equivalent resistance. The total gain provided by U6 is computed by summing the contribution of each bit as shown in the following equation:

$$GAIN = B5\,(-R16/R4) + B4\,(-R16/2R4) + B3\,(-R16/4R4) + B2\,(-R16/8R4) + B1\,(-R16/16R4) + B0\,(-R16/32R4)$$

Where:

$$R4 = R6 = R8 = R10 = R12 = R14 = R15$$

$$R5 = R7 = R9 = R11 = R13$$

$$R4 = 2\,(R5)$$

With resistive values shown in Sections C and D (FIG. 27), the gain in this design can range from 1 to approximately 5. By changing the values used in the above equation, it is possible to alter the dynamic range to fit another application. It is also possible to increase gain resolution by adding more switches and resistors to the summing junction of U6.

Section E of FIG. 27 is an output clamping circuit designed to limit the maximum amplitude that the PGA can produce. This is a useful feature since nuclear detectors will occasionally produce large output pulses that may degrade sensitive electronics. The clamping circuit will begin to function when U6 produces an output pulse whose amplitude is +6.2 V or greater. At that instant, the Zener diode (D1) opens up and clamps the output of U6 to +6.2 V. The resultant clamping voltage is then trimmed to a desired value by the use of R17 and R18. With the values in FIG. 27, clamping will occur (at the output of the PGA) at 5.0 V. If a clamping level higher than +6.2 V is desired, a higher value Zener diode can be used and different trimming resistors selected. U7 in Section E is the output driver for the PGA. It uses the same configuration as U1 and provides the PGA with a low output impedance. This is important because it allows the PGA to drive other circuits with a minimum of signal distortion.

Another useful feature of this amplifier is its ability to block DC levels at its input. This can be important if the preamplifier produces significant DC offsets. An amplifier that did not block these offsets could possibly become useless by saturating itself. Increased power consumption would also be a detrimental side effect. DC blocking occurs at two separate locations inside the PGA using a C-R high pass filter. The first filter is at C6 in FIG. 27. The resistive leg of the filter can be viewed as the equivalent resistance leading to the summing junction of U6. The second filter is at C18. The resistive portion of the filter is formed by the sum of R17 and R18.

Figure 28A:
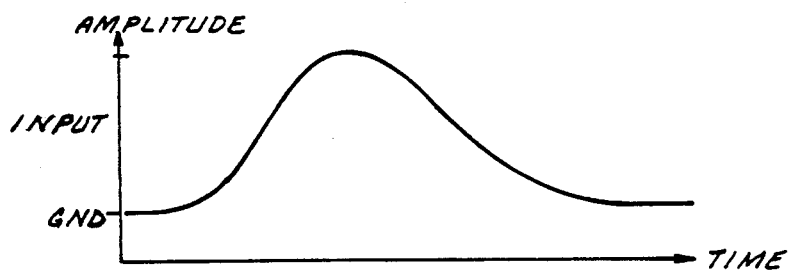
FIGS. 28A and 28B are a pair of graphs depicting the input and output for the peak detector function used in the present invention.

Turning again to FIG. 24, the next functional block on the processor board is the peak detector 180. Peak detector 180 is depicted within the dashed lines of FIG. 25A. It should be noted here that the peak detector function is not related to the neutron peak found in the spectra. FIGS. 28A and B show the input and output of the peak detector 180. Pulses leaving the PGA 178 output are fed directly into the input of the peak detector 180. As the input pulse is rising towards its maximum amplitude, the output of the peak detector will track its input. Once the input pulse has reached its peak and starts heading downwards, the output will stop tracking the input. The output of the peak detector is now producing a DC voltage whose amplitude is identical to the peak amplitude of the input pulse.

Figure 28B:
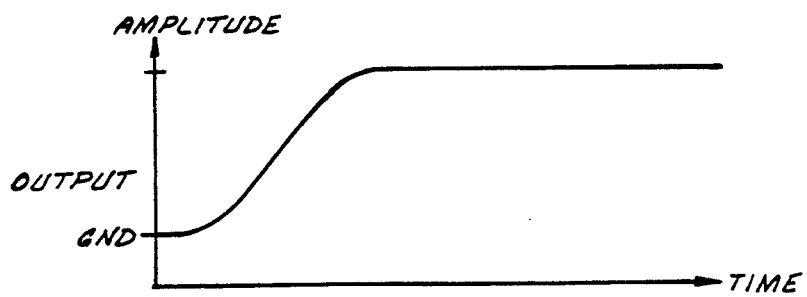

The input pulse can have any amplitude ranging from 200 mV to 5 V. It is the peak detector's function to capture the peak amplitude of the input pulse and convert this amplitude into a stable DC voltage as shown in FIG. 28B. The output of the peak detector is then sent to an A/D converter where it is digitized.

The input pulse of FIG. 28A cannot be sent directly to an A/D converter because the peak amplitude only exists for approximately 100 nS. Most A/D converters are not fast enough to accurately convert a high speed signal such as this; and requires that their inputs be limited to a maximum slew rate. Thus, the peak detector circuit creates a bridge between high speed analog pulses and the speed limitations of A/D converters.

Figure 28C:
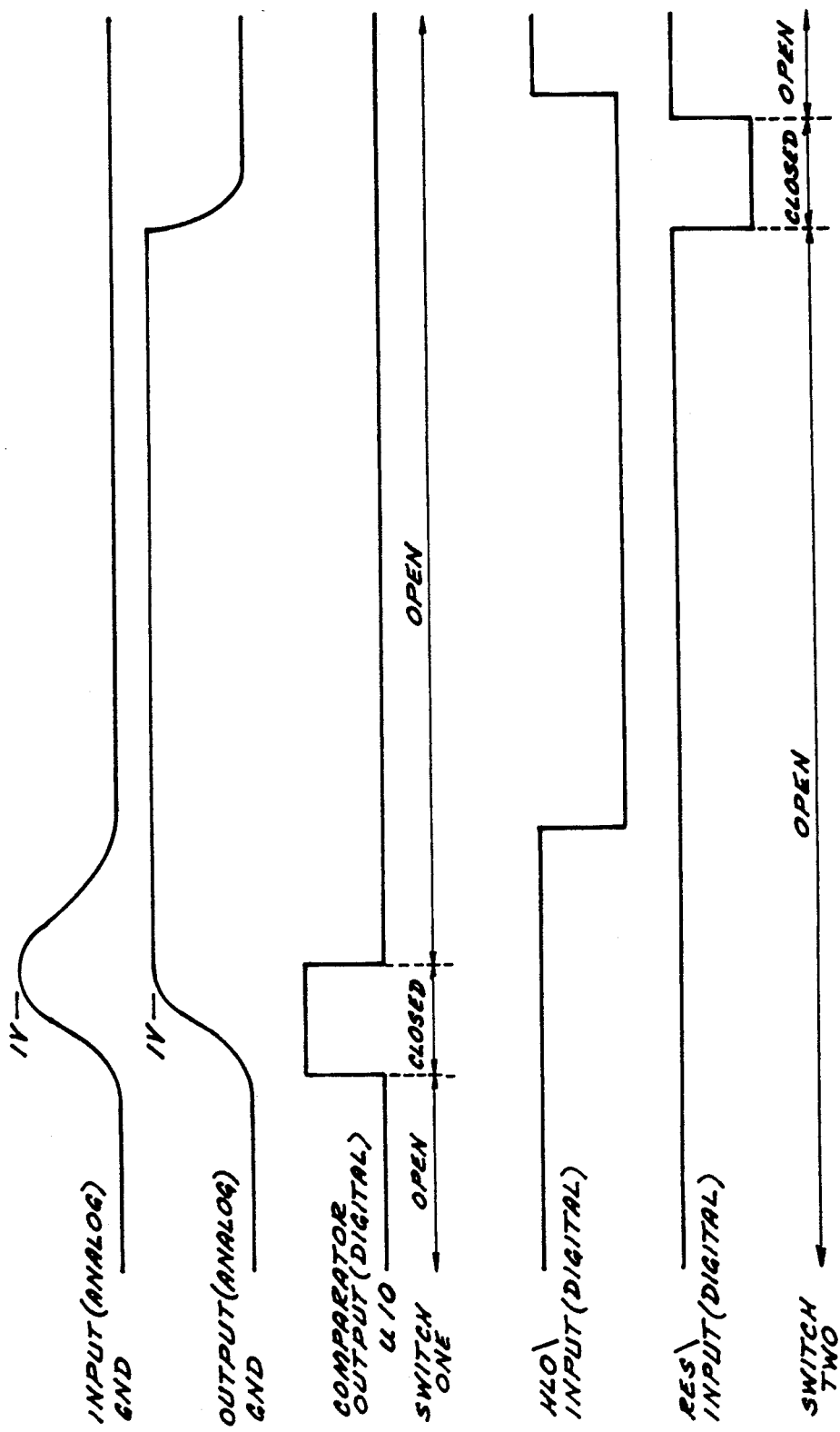
FIG. 28C is a timing diagram for the peak detector circuit.

To understand the operation of circuit 180, reference is made to FIG. 28C which illustrates a normal peak detection cycle. When the input of the circuit starts to rise (due to the arrival of a pulse) the high speed comparator (U10) will sense that the input is greater than the output. This causes the comparator output to switch from a logic 0 to a logic 1 which causes switch 1 to be in a closed (conducting) state.

Since switch 1 is now closed it will allow the unity gain follower (U9) to charge the memory capacitor (C57) to the same voltage which is present on the input. Another unity gain follower (U12) is used to isolate the memory capacitor from the output of the circuit. Referring to FIG. 28C, it can be seen that the output tracks the input only while the input pulse is still rising.

Just after the input pulse reaches its peak amplitude, the input voltage will be slightly less than the existing output voltage. As shown in FIG. 28C, this causes the comparator output (U10) to change from a logic 1 to a logic 0. This in turn causes switch 1 to open (become non conducting) and prevent the memory capacitor (C57) from discharging through U9. Since the charge in the memory capacitor is now isolated from any low impedance paths, it will effectively maintain a constant voltage on the output of U12.

An important feature of peak detection circuit 180 is a digital input called HLD. The HLD line is used to disable the peak detector after a pulse has been captured. If a one volt pulse has already been captured and a two volt pulse subsequently entered the input, then the one volt output would be overwritten by the two volt pulse. This problem is eliminated by changing the HLD signal from a logic 1 to a logic 0 after a pulse is captures. FIG. 28C shows an appropriate use of the HLD input. As long as the HLD line remains at a logic 0 the input of the peak detector will be disabled.

After the A/D has completed its conversion, the system must have a means to initialize the peak detector so that it can capture another pulse. This function is provided by the use of a digital input called RES. If RES is set to a logic 0, then switch 2 will close (conducting) and cause the memory capacitor to discharge to ground. FIG. 28C shows the proper application of the RES input.

In peak detector circuits of this type, it is possible that small amounts of noise (on either the input or output) can lead to erroneous switching of the high speed comparator (U10). This undesireable switching will obviously degrade the accuracy of the circuit since switch 1 will not be in its correct state. Most of this noise sensitivity has been alleviated by passing the comparator inputs through a low pass filter. An RC low pass filter is created for the positive and negative comparator inputs via R38, C63 and R41, C64, respectively. This low pass filter constitutes an important feature of the peak detector of this invention.

Another important feature of peak detector 180 is that its output droops towards a ground state. All peak detectors exhibit a condition known as droop. This is caused by a small continuous movement of charge into or out of the memory capacitor due to IC bias currents or resistive paths. This will result in a time dependant voltage gain or loss at the output of the peak detector. If droop occurs in a positive direction, then the peak detector could gradually build a large enough amplitude (on its output) to lock itself up. This problem is avoided in circuit 180 by the addition of R24. This large value resistor provides a small leakage current that prevents IC bias currents from placing a net positive charge into the memory capacitor C57.

In some known peak detector circuits of the type described herein, it is possible to demonstrate an error condition that can lead to thermal burnout cf U9, switch 1 and switch 2. If the RES signal is low while HLD is high, then it is possible to have both switches in a closed (conducting) state. Looking at the unity gain follower output U9, it is possible to trace a current path through switches 1 and 2 to ground. In effect, the IC U9 would be driving a short circuit to ground which could destroy it or the switches. The peak detection circuit 180 of this invention has taken this possible error condition into account by using the RES signal to control not only switch but also switch 1. Referring to FIG. 25A, switch 1 (which is used for charging the memory capacitor) is controlled via the output of gate U22. If the RES signal is low, then the gate U22 will always open switch 1 and thus prevent U9 from driving a short circuit. Thus, an error condition involving the use of the HLD and RES signals will not cause hardware failures in circuit 180.

Figure 29:
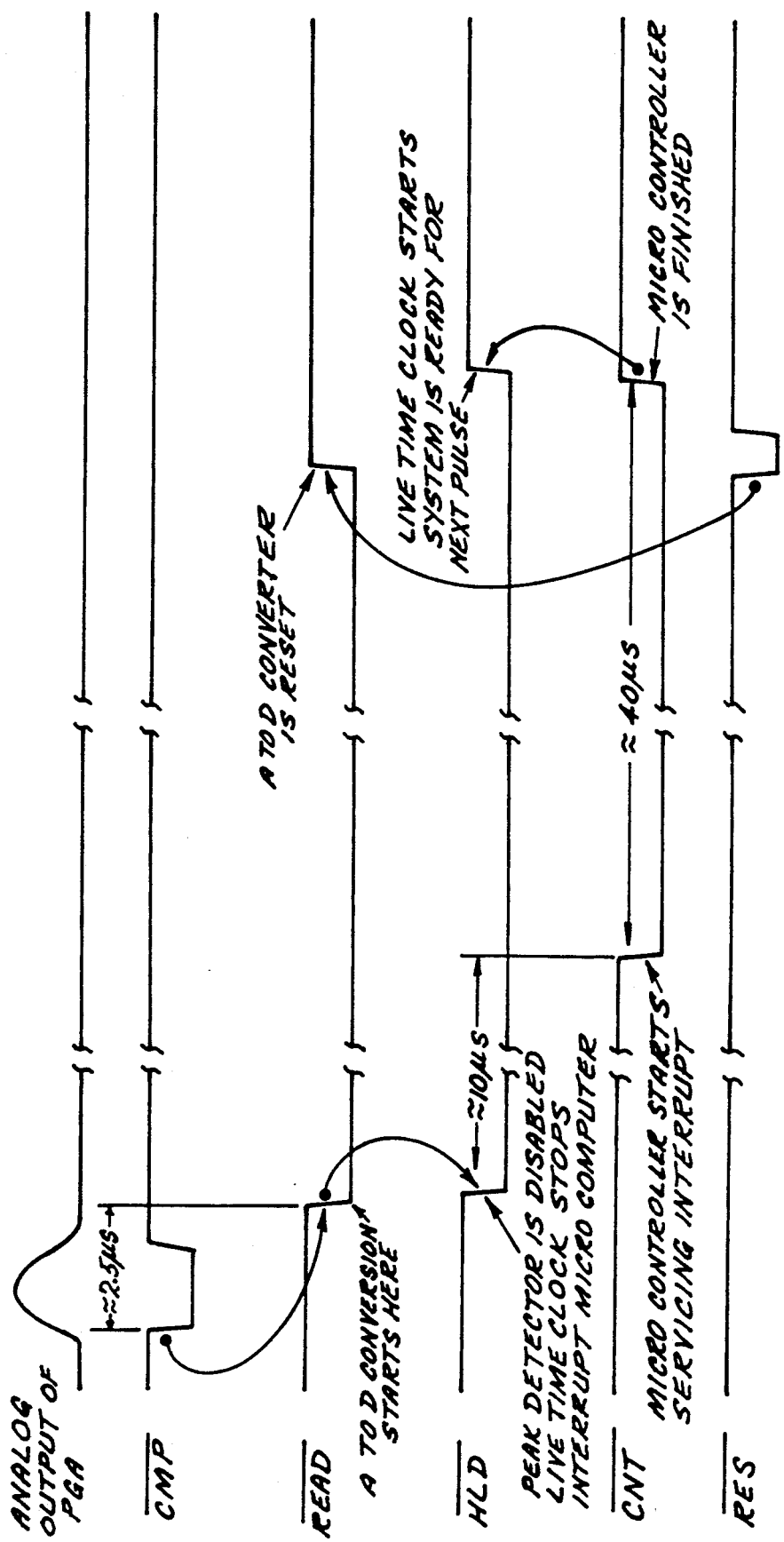
FIG. 29 is a timing diagram for pulse acquisitions made by the detectors and electronics of the present invention.

At this point, reference should be made to FIG. 29 for an explanation of the coordination of analog and digital events. When a pulse leaves PGA 178 it is also being fed into a comparator 182 as well as peak detector 180. If the output of the PGA exceeds 200 mV then the comparator output signal (CMP) is asserted low. The falling edge of CMP is a signal to the entire system that a valid pulse has left the output of the PGA. Pulses which are below the comparator threshold are ignored by the system and will not become part of the spectrum.

When a falling edge is detected on CMP, a timer starts operating that times out in approximately 2.5 microseconds. After the 2.5 microseconds has elapsed, the READ and HLD lines are asserted low as shown in FIG. 29. The READ line tells the A/D converter 184 to start a conversion on the analog signal presented to it by peak detector 180.

The HLD line serves three purposes in the present invention. The first of these is to tell the peak detector 180 that no more pulses are to be allowed into its analog memory. Thus, after the HLD line goes low, subsequent pulses are locked out of peak detector 180.

The second function of the HLD line is to generate an interrupt to microprocessor 174. This interrupt will tell the microprocessor that a pulse has undergone conversion and is waiting to be read. Since the microprocessor takes approximately 8 microseconds to vector to its interrupt, the A/D conversion 184 will already be complete when the service routine starts.

The last function that the HLD line performs is to enable and disable the timer that is associated with the microprocessors interrupt line. Whenever the HLD line is low this timer (which is built into the microprocessor) is gated off. This timer is necessary because it keeps track of what is known as live time.

Live time is defined as that quantity of time during which the MCA is not busy processing pulses. Conversely, dead time is the quantity of time spent by the MCA actually servicing pulses that come in. To illustrate live and dead time, assume that the MCA is going to collect a spectrum for 1 second in real time. If each pulse takes 50 microseconds to service and there are 1,000 events during the 1 s acquisition period, then the total dead time is 50 milliseconds. The live time for this scenario would be 950 milliseconds.

The live time is important when calculating count rates from the neutron detectors. Processing of spectra yields a gross neutron count which is then divided by the live time to give the neutron count rate. The units of the count rate is neutrons/second.

When the microcontroller 174 starts servicing its interrupt routine the first action that it takes is to pull the CNT line low. This output of the microcontroller gives the microcontroller control over the pulse acquisition hardware. As long as the CNT line is low no other pulses can get into the pulse acquisition hardware. After the microcontroller is finished servicing the interrupt routine the last thing it does is release this line.

Near the end of the interrupt service routine the microcontroller pulses the res line low for approximately 1 microsecond. This line serves two purposes. It simultaneously resets the analog memory of the peak detector 180 and it resets the hardware that controls the READ line of the A/D converter 184.

During the interrupt service route the microprocessor will update its spectrum to include the pulse that has just been captured. At the beginning of the service routine, one of its earliest actions is to read the data from the A/D converter 184. The data bus of the A/D has been mapped into the memory of the microprocessor and a simple software read instruction allows the microprocessor to access the conversion.

After the A/D has been read, the microprocessor uses the 8 bit value as a pointer to the correct channel stored in the microprocessor's memory. The existing count in that channel is incremented by one and the new count is placed back into memory. This process is repeated many times to acquire enough statistics so that a clear spectrum is created.

If a pulse enters the system while the HLD line is low it will be ignored and have no impact on the system. Thus, the system is "dead". FIG. 29 shows that HLD is low for almost the whole pulse acquisition cycle. If the count rates are very high then the dead time may become a significant fraction of real acquisition time. It is for this reason that an MCA is designed to minimize the dead time for each pulse acquisition cycle.

After a preselected acquisition cycle has been completed the microcontroller 174 will process both spectra and calculate the resultant count rates. The near and far count rates are then available to either be stored in the memory tool or the near/far ratio may be calculated and transmitted uphole via the mud pulsing system located in drill string section 26 of FIG. 1.

The high resolution logs are produced after drilling has stopped and the contents of the memory tool are read at the surface.

TABLE 2

| COMPONENT (FIGS. 25A-C) | DESCRIPTION |
|---|---|
| U1 | Multiplexer |
| U22 | NAND Gate |
| U23 | Hybrid PGA |
| U9, U12 | Operational Amplifier |
| U10, U15 | Comparator |
| U11 | Switch |
| U13 | A to D Converter |
| U14 | Voltage Reference |
| U16 | NAND Gate Schmitt trigger |
| U17 | Programmable Gate Array |
| U18 | Serial ROM |
| U19 | Microcontroller Reset Function |
| U20 | Transceiver |
| U21 | Microcontroller |
| X1 | Hybrid Oscillator |

Spectrum Digital Processing

As already mentioned, an important feature of this invention is the spectrum digital processing technique which results in the gamma-stripped spectrum of FIG. 19B. This processing technique and the associated software will now be described with respect to the flow chart of FIGS. 30A-C.

It will be recalled that the raw spectra of FIG. 18 must undergo data processing to achieve the gamma-stripped spectra of FIG. 19B. The data processing is composed of three parts. Part one involves smoothing the raw spectrum. In part two, the shape of the smoothed spectrum is characterized by its two peaks, a valley therebetween and a least squares fitting is used to produce the gamma-ray background spectrum curve (FIG. 19A) which is subtracted from the original spectrum to yield the preliminary neutron spectrum (free of gamma rays). In the third part, the neutron spectrum is analyzed statistically in order to modify it and yield as a final result the total neutron counts.

Part I. Using the SMOOTH routine, the raw spectrum (as in FIG. 18) is smoothed (at 300 in FIG. 30A) by passing an eleven point window successively through the histogram and averaging each set of eleven points. The process is then repeated for the purpose of further smoothing (at 302 in FIG. 30A). For example, if channels 1 through 11 are being averaged, the average value is inserted at channel 6 (the mid-point). The eleven channel window is then moved up one channel and channels 12 through 22 are averaged with the average being inserted at channel 17. This process is carried forward through the 256 channels. To obtain the smoothed value for channel zero, it is assumed that there are channels −1 through channel −5 which have the same value as channel zero and the window runs from channel −5 through channel +5. A similar procedure occurs at channel 256. The results of this routine are then passed to the SMOOTH routine for further smoothing of the already processed raw spectrum.

Part II. The spectrum having now been smoothed must be characterized according to its shape: its two peaks and the valley between them. The search for the gamma-ray peak is performed using the PEAK routine. Starting at channel 1, a search is performed using a ten channel window and finding the channel with the highest count in that window. The search is then repeated with the window shifted so that the first channel of the window corresponds to the channel with the highest count previously found. The process continues until the peak channel number does not change. The peak channel number is referred to as NGAMMA. With the determination of the gamma peak channel number, NGAMMA, an integration of the raw spectral curve from channel 2 though (2*NGAMMA) is performed to determine total background gamma counts. This value is a secondary measurement to the neutron count measurement.

Next, the search for the valley between the gamma-ray peak and the neutron peak is made using the VALLEY routine. Starting at channel (NGAMMA+10), a search is made using the ten channel window and looking for the lowest count. When the lowest count is found, the window is shifted so that the first channel of the window corresponds to this lowest count. The process continues until the channel number found having the lowest count does not change and NVALLEY1 is the result. It should be noted that because of the shape of the spectrum, the VALLEY routine would not mistakenly find the valley in the region beyond the neutron peak.

The neutron peak is found by using the PEAK routine in a manner which follows. A search is made from (NVALLEY1+10) through channel 256 using a 100 channel window to find the channel with the highest count. The search is then repeated with the window shifted so that the first channel of the window corresponds to the channel with the highest count previously found. This process continues until this peak channel number does not change and the result is NNEUTRON.

Lastly, a search is made for a revised valley between the gamma peak and the neutron peak. This procedure amounts to a check on the initial value NVALLEY1 with the result being called NVALLEY. Using a 100 channel window, a search is made from channel (NVALLEY1-10) through channel 256 for the lowest count. When the lowest count is found, the window is shifted so that the first channel of the window corresponds to this lowest count. The process continues until the channel number having the lowest count no longer changes and NVALLEY is the result.

Having evaluated the shape of the curve which includes both neutron and gamma-ray peaks, it now becomes possible to separate out the portions of the curve due to each. To do this, a first estimate of the gamma-ray background is made using a procedure to be described. It is known from other considerations that the gamma-ray background will be that of a decaying exponential curve. Such a decaying exponential curve can be written in the form $$Y = A(X^B) \quad (1)$$

where A and B are two parameters to be fitted to this curve by a least square fitting routine and X is the channel number. If logarithms of both sides of (1) are taken, then (1) becomes:

$$\log y = \log A + b(\log X) \quad (2)$$

the equation for a straight line. Using a software routine known as (at 304 in FIG. 30B), a least square fit to a straight line is made such that the line is constrained to pass through the following four points:

$N1 = NGAMMA + 0.1(NVALLEY - NGAMMA)$ $N2 = NGAMMA + 0.9(NVALLEY - NGAMMA)$ $N3 = NNEUTRON + 1.67(NNEUTRON - NVALLEY)$, but if N3 is greater than 226, then N3=216 and N4=246. The choice of the four points is not totally arbitrary but is based on experience and experiment. The LLSFIT routine 304 replots smoothed spectrum as log (channel) vs. log (counts), and fits a straight line constrained to pass through points N1, N2, N3 and N4. Linear fit is described with a slope=A and an intercept=B.

The background gamma-ray curve so derived is then subtracted channel by channel between channels N1 and N4 inclusive from the previously smoothed spectrum. This subtraction is performed using a software routine known as BCKGRND (at 306 in FIG. 30B). The resultant curve represents a neutron-only spectrum. The BCKGRND routine substracts the fit curve described in LLSFIT from the smoothed spectrum. Neutron spectral curve is the result.

Figure 30A:
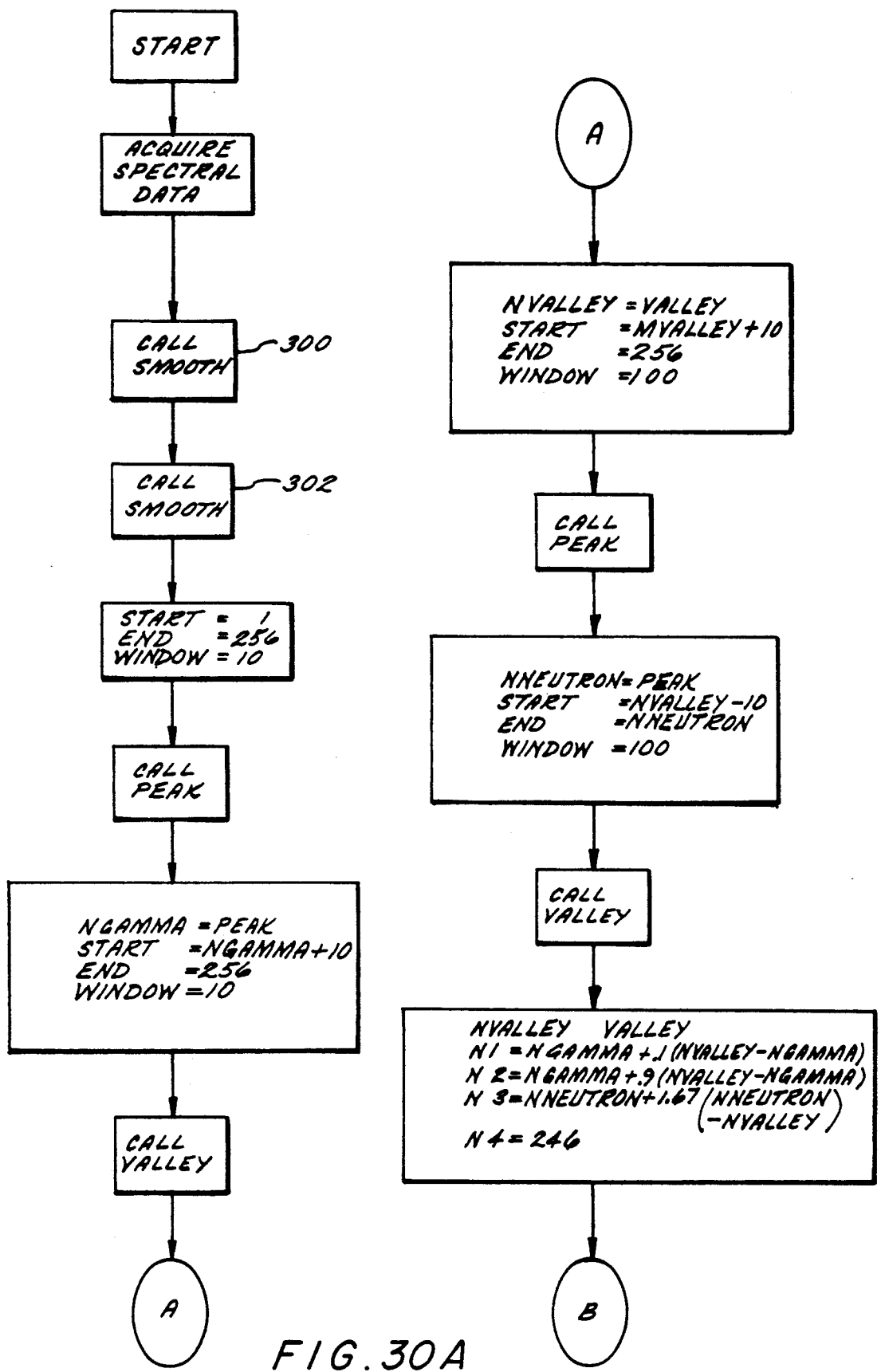
FIGS. 30A-C is a flow chart of the digital processing technique for gamma ray stripping.
Figure 30B:
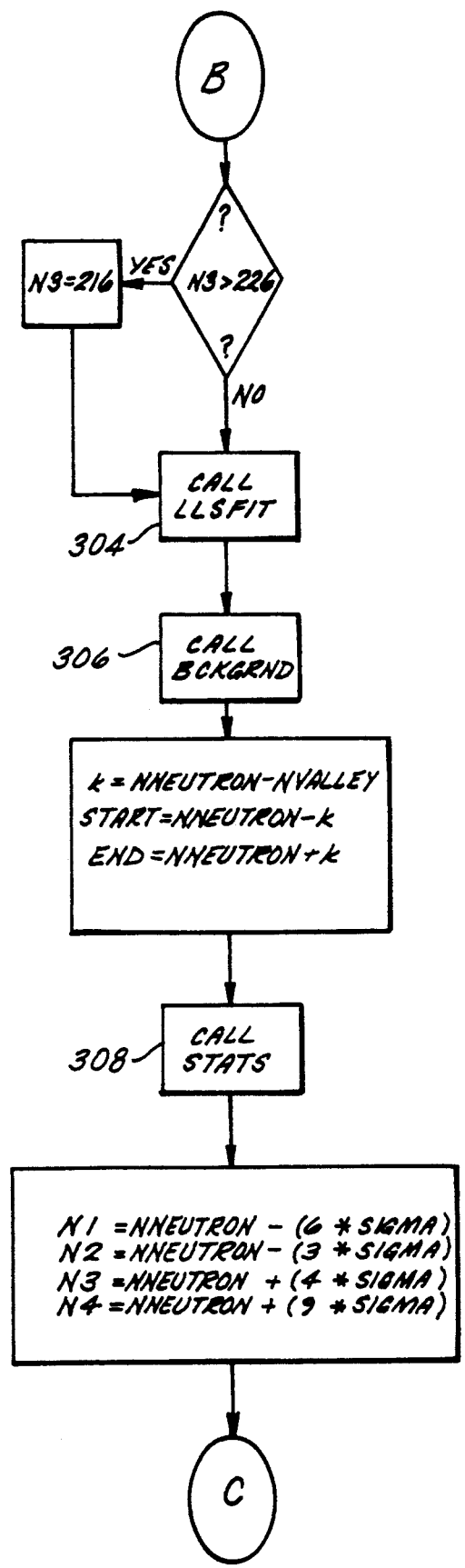

This neutron-only spectrum is now subjected to some more refined analysis using a software routine known as STATS (a statistical analysis shown at 308 in FIG. 30B). This routine looks at the neutron-only spectrum from channel NNEUTRON−(NNEUTRON−NVALLEY) to channel NNEUTRON+(NNEUTRON−NVALLEY). In other words,, it is looking at a region symmetric about the neutron peak and determines Neutron counts by integrating the neutron Spectral curve between channels Start and End. It then calculates the following:

(1) SIGMA, the standard deviation about the neutron peak;

(2) MEAN, the mean channel number, the statistical center of the neutron peak; and (3) COUNTS, the total number of neutron counts found by integrating under the resultant curve (the resultant curve being Gaussian)

Part III. In this part, the first estimate of the gamma-ray background curve is replaced by a more sophisticated analysis. The values N1 through N4 are recalculated making use of the just derived value of SIGMA (which assumes a Gaussian shape for the neutron peak). The new values are as follows:

N1=NNEUTRON−(6×SIGMA), but limited to a minimal value of N1 from the previous pass;

N2=NNEUTRON−(3×SIGMA), but limited to a maximum value of NVALLEY (note the assumption that three standard deviations from the mean must be very close to a minimum value);

N3=NNEUTRON+(4×SIGMA), but limited to a maximum channel number of 216; and

N4=NNEUTRON+(9×SIGMA), but limited to a maximum channel number of 251.

The new values of N1 through N4 are run through the LLSFIT routine (at 310 in FIG. 30C) as before to obtain a more accurate estimate of the gamma-ray background curve. Again, the subtraction routine BCKGRND (at 312 in FIG. 30C) is used with the new values of N1 through N4.

The newly derived neutron-only curve is now once again subjected to the STATS (at 314 in FIG. 30C) routine to calculate MEAN and COUNTS. In doing so, the SIGMA obtained from the first pass processing is used to determine the end points of this STATS processing: channels NNEUTRON−(3×SIGMA) to NNEUTRON+(3×SIGMA).

For each acquisition, the above-described processing is done separately for the near and far detector.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A nuclear logging apparatus for logging a borehole formation comprising:
    a drill collar sub;
    a radioactive source in said sub;
    at least one lithium detector assembly in said sub, said detector assembly being spaced from said radioactive source and said detector assembly being positioned to detect radiation resulting from neutrons emitted by said source; and
    electronic circuit means communicating with said at least one detector assembly, said electronic circuit means including microprocessor means for analyzing radiation detected by said detector assembly and providing a nuclear log of a borehole formation.

2. The apparatus of claim 1 wherein:
    said lithium detector assembly includes $Li^6I$ crystal.

3. The apparatus of claim 1 wherein:
    said lithium detector assembly includes $Li^6$ doped glass.

4. The apparatus of claim 1 wherein said detector assembly comprises:
    a lithium detector bonded to a photomultiplier tube.

5. The apparatus of claim 4 including:
    potting surrounding said lithium detector and said photomultiplier tube.

6. The apparatus of claim 5 including:
    ribbing on said potting for providing shock absorption.

7. The apparatus of claim 1 wherein said electronic circuit means develops a raw radiation spectrum based on input from said detector assembly, said raw radiation spectrum including a gamma-ray background based on detected gamma rays and a neutron peak based on detected neutrons, and including:
    digital processing means for removing the gamma ray background from said raw spectrum to define a gamma-stripped spectrum.

8. The apparatus of claim 7 wherein said digital processing means comprises:
    means for defining a gamma ray contributed spectrum portion by fitting an exponential curve to said raw spectrum that approximates that portion of said raw spectrum which has been contributed by gamma rays; and
    means for subtracting the gamma ray contributed spectrum portion from said raw spectrum to produce said gamma-stripped spectrum.

9. The apparatus of claim 8 including:
    means for smoothing said raw radiation spectrum prior to fitting said exponential curve.

10. The apparatus of claim 8 wherein said digital processing means further comprises:
    means for analyzing said gamma-stripped spectrum to yield the number of neutrons detected by said detector assembly per unit of time.

11. The apparatus of claim 7 including:
    programmable gain amplifier means for adjusting said neutron peak to a preselected position on said raw radiation spectrum.

12. The apparatus of claim 11 including:
    peak detector means communicating with the output of said programmable gain amplifier, said peak detector means converting the output of said programmable gain amplifier means into a stable DC signal adapted to be measured by an analog to digital converter.

13. The apparatus of claim 1 wherein said electronic circuit means develops a raw radiation spectrum based on input from said detector assembly, said raw radiation spectrum including a gamma-ray background based on detected gamma rays and a neutron peak based on detected neutrons, and including:
    digital processing means for determining the total background gamma counts from said gamma ray background of said raw spectrum.

14. The apparatus of claim 13 wherein:
    said background gamma counts are determined by integrating the gamma-ray background of said raw spectrum.

15. The apparatus of claim 1 wherein said sub includes a wall and wherein:
    said source is mounted in said wall of said sub.

16. The apparatus of claim 1 wherein said sub includes a sub wall and including:
    a plurality of chambers in said sub wall;
    a plurality of chamber covers, one each of said chamber covers including attachment means for forming fluid tight and removable attachment to one each of said chambers; and
    said at least one detector assembly being positioned in one of said plurality of said chambers.

17. The apparatus of claim 16 including:
    three aligned chambers equally spaced about the outer circumference of said sub with said at least one detector assembly residing in a first of said three chambers, said microprocessor means residing in a second of said three chambers and a power supply and power supply circuit means residing in a third of said three chambers.

18. The apparatus of claim 16 wherein:
    each of said chambers is interconnected by a passageway through said sub wall.

19. The apparatus of claim 1 wherein said drill collar sub has a longitudinal axis and wherein said sub wall has an outer circumference and including:
    a first passage through at least a portion of said sub wall, said first passage terminating at a first opening on said outer circumference of said sub wall with said radioactive source being mounted in said first passage.

20. The apparatus of claim 19 wherein:
    said source is orthogonal to said longitudinal axis of said sub.

21. The apparatus of claim 20 wherein:
    said source is substantially aligned with said at least one detector assembly.

22. The apparatus of claim 19 wherein said source is mounted in a container, said container having a first end with external threading, and including:
threading in said first passage wherein said external threading on said first end of said container is mated to said threading in said first passage.

23. The apparatus of claim 19 including:
a second passage extending between the outer circumference of said sub wall and said first passage; and
a bolt in said second passage in engagement with said source.

24. The apparatus of claim 19 wherein:
said first passage is positioned on a chord with respect to said outer circumference of said sub wall.

25. The apparatus of claim 1 including:
at least one chamber in said sub wall;
at least one chamber cover, said chamber cover including attachment means for forming fluid tight and removable attachment to said at least one chamber; and
said detector assembly being positioned in said at least one chamber.

26. A nuclear logging apparatus for logging a borehole formation comprising:
a drill collar sub;
a radioactive source in said sub;
at least one detector assembly in said sub, said detector assembly being spaced from said radioactive source and said detector assembly being positioned to detect radiation resulting from neutrons emitted by said source;
electronic circuit means communicating with said detector assembly, said electronic circuit means including microprocessor means for analyzing radiation detected by said detector assembly and providing a nuclear log of a borehole formation;
wherein said electronic circuit means develops a raw radiation spectrum based on input from said detector assembly, said raw radiation spectrum including a gamma-ray background based on detected gamma rays and a neutron peak based on detected neutrons, and including;
digital processing means for removing the gamma-ray peak from said raw spectrum to define a gamma-stripped spectrum.

27. The apparatus of claim 26 wherein said digital processing means comprises:
means for defining a gamma ray contributed spectrum portion by fitting an exponential curve to said raw spectrum that approximates that portion of said raw spectrum which has been contributed by gamma rays; and
means for subtracting the gamma ray contributed spectrum portion from said raw spectrum to produce said gamma-stripped spectrum.

28. The apparatus of claim 27 including:
means for smoothing said raw radiation spectrum prior to fitting said exponential curve.

29. The apparatus of claim 27 wherein said digital processing means further comprises:
means for analyzing said gamma-stripped spectrum to yield the number of neutrons detected by said detector assembly per unit of time.

30. A nuclear logging apparatus for logging a borehole formation comprising:
a drill collar sub;
a radioactive source in said sub;
at least one detector assembly in said sub, said detector assembly being spaced from said radioactive source and said detector assembly being positioned to detect radiation resulting from neutrons emitted by said source;
electronic circuit means communicating with said detector assembly, said electronic circuit means including microprocessor means for analyzing radiation detected by said detector assembly and providing a nuclear log of a borehole formation;
wherein said electronic circuit means develops a raw radiation spectrum based on input from said detector assembly, said raw radiation spectrum including a gamma-ray background based on detected gamma rays and a neutron peak based on detected neutrons, and including;
digital processing means for determining the total background gamma counts from said gamma-ray background of said raw spectrum.

31. The apparatus of claim 30 wherein:
said background gamma counts are determined by integrating the gamma-ray background of said raw spectrum.

32. A nuclear logging method for logging a borehole formation using a logging tool comprising a drill collar sub, a radioactive source in said sub, at least one detector assembly in said sub, said detector assembly being spaced from said radioactive source and said detector assembly being positioned to detect radiation resulting from neutrons emitted by said source, and electronic circuit means communicating with said detector assembly, said electronic circuit means including microprocessor means for analyzing radiation detected by said detector assemblies and providing a nuclear log of a borehole formation, the method including the step of:
forming said at least one detector assembly from lithium.

33. The method of claim 32 wherein:
said lithium detector assembly includes $Li^6I$ crystal.

34. The method of claim 32 wherein:
said lithium detector assembly includes $Li^6$ doped glass.

35. The method of claim 32 including the steps of:
developing a raw radiation spectrum based on input from said detector assemblies, said raw radiation spectrum including a gamma-ray peak based on detected gamma rays and a neutron peak based on detected neutrons; and
removing the gamma-ray background from said raw spectrum to define a gamma-stripped spectrum.

36. The method of claim 35 wherein digital processing is used to obtain said gamma-stripped spectrum, said digital processing including:
defining a gamma ray contributed spectrum portion by fitting an exponential curve to said raw spectrum that approximates that portion of said raw spectrum which has been contributed by gamma rays; and
subtracting the gamma ray contributed spectrum portion from said raw spectrum to produce said gamma-stripped spectrum.

37. The method of claim 36 including:
smoothing said raw radiation spectrum prior to fitting said exponential curve.

38. The method of claim 36 wherein said digital processing means further comprises:

analyzing said gamma-stripped spectrum to yield the number of neutrons detected by said detector assembly per unit of time.

39. The method of claim 32 wherein said electronic circuit means develops a raw radiation spectrum based on input from said detector assembly, said raw radiation spectrum including a gamma-ray background based on detected gamma rays and a neutron peak based on detected neutrons, and including:
determining the total background gamma counts from said gamma-ray background of said raw spectrum.

40. The method of claim 39 including:
determining said background gamma counts by integrating the gamma-ray background of said raw spectrum.

41. A nuclear logging method for logging a borehole formation using a logging tool comprising a drill collar sub, a radioactive source in said sub, at least one detector assembly in said sub, said detector assembly being spaced from said radioactive source and said detector assembly being positioned to detect radiation resulting from neutrons emitted by said source, and electronic circuit means communicating with said detector assembly, said electronic circuit means including microprocessor means for analyzing radiation detected from said detector assembly and providing a nuclear log of a borehole formation, including the steps of:
developing a raw radiation spectrum based on input from said detector assembly, said raw radiation spectrum including a gamma ray background based on detected gamma rays and a neutron peak based on detected neutrons; and
removing the gamma ray background from said raw spectrum to define a gamma-stripped spectrum.

42. The method of claim 41 wherein digital processing is used to obtain said gamma-stripped spectrum, said digital processing including:
defining a gamma ray contributed spectrum portion by fitting an exponential curve to said raw spectrum that approximates that portion of said raw spectrum which has been contributed by gamma rays; and
subtracting the gamma ray contributed spectrum portion from said raw spectrum to produce said gamma-stripped spectrum.

43. The method of claim 42 including:
smoothing said raw radiation spectrum prior to fitting said exponential curve.

44. The method of claim 42 wherein said digital processing means further comprises:
analyzing said gamma-stripped spectrum to yield the number of neutrons detected by said detector assembly per unit of time.

45. The method of claim 41 including:
determining the total background gamma counts from said gamma-ray background of said raw spectrum.

46. The method of claim 45 including:
determining said background gamma counts by integrating the gamma-ray background of said raw spectrum.

47. A nuclear logging method for logging a borehole formation using a logging tool comprising a drill collar sub, a radioactive source in said sub, at least one detector assembly in said sub, said detector assembly being spaced from said radioactive source and said detector assembly being positioned to detect radiation resulting from neutrons emitted by said source, and electronic circuit means communicating with said detector assembly, said electronic circuit means including microprocessor means for analyzing radiation selected from said detector assembly and providing a nuclear log of a borehole formation, including the steps of:
developing a raw radiation spectrum based on input from said detector assembly, said raw radiation spectrum including a gamma-ray background based on detected gamma rays and a neutron peak based on detected neutrons; and
determining the total background gamma counts from said gamma-ray background of said raw spectrum.

48. The method of claim 47 including:
determining said background gamma counts by integrating the gamma-ray background of said raw spectrum.

* * * * *

UNITED STATES PATENT AND TRADEMARK OFFICE
CERTIFICATE OF CORRECTION

PATENT NO. : 5,278,758

DATED : January 11, 1994

INVENTOR(S) : Carl A. Perry, et al

It is certified that error appears in the above-identified patent and that said Letters Patent is hereby corrected as shown below:

On drawing sheet,

In FIG. 30A In the box under the circled "A" in the right column, delete --MVALLEY+10-- and insert therefore "NVALLEY+10"

In FIG 30A In the box above the circled "B" in the right column, between "NVALLEY" and "VALLEY", insert "="

Figure 30C:
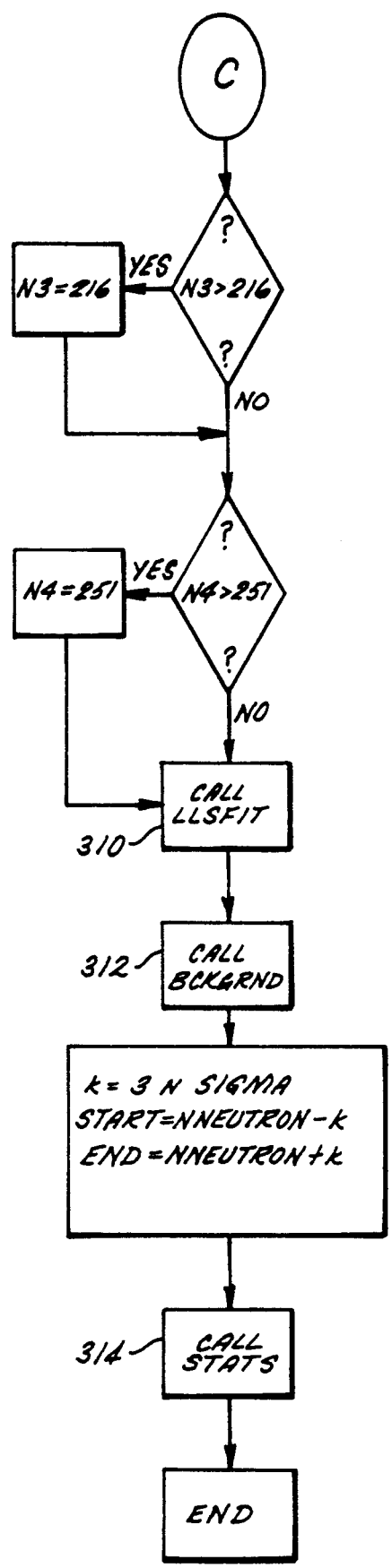

In FIG 30C In the box which follows "CALL BCKGRND", delete --k=3 N SIGMA-- and insert therefore "k=3 N * SIGMA"

Col. 5 Line 57 Delete --subwall-- and insert therefore "sub wall"

Col. 8, line 49 Delete --tools-- and insert therefore "tool's"

Col. 10 Line 10 Delete --subwall-- and insert therefore "sub wall"

Col. 13, line 2, delete "subwall" and insert --sub wall--.

Col. 13 Line 7 Delete --subwall-- and insert therefore "sub wall"

Col. 13, line 17, delete "subwall" and insert --sub wall--.

Col. 13 Line 24 Delete --subwall-- and insert therefore "sub wall"

Col. 13 Line 28 Delete --optimizes-- and insert therefore "optimized"

Col. 13 Line 45 Delete --complimentary-- and insert therefore "complementary"

Col 16 Lines 4-5 Delete --process-- and insert therefore "processes"

UNITED STATES PATENT AND TRADEMARK OFFICE
CERTIFICATE OF CORRECTION

PATENT NO. : 5,278,758

DATED : January 11, 1994

INVENTOR(S) : Carl A. Perry, et al

It is certified that error appears in the above-identified patent and that said Letters Patent is hereby corrected as shown below:

Col. 19 Line 48  Delete --non conducting-- and insert therefore "non-conducting"

Col. 20 Line 7   Delete --undesireable-- and insert therefore "undesirable"

Col. 20 Line 32  After "burnout", delete --cf-- and insert therefore "of"

Col. 21 Line 13  Delete --microprocessors-- and insert therefore "microprocessor's"

Col. 21 Line 41  Delete --the res line-- and insert therefore "the RES line"

Col. 21 Line 46  Delete --route-- and insert therefore "routine"

Signed and Sealed this

Sixth Day of September, 1994

Attest:

BRUCE LEHMAN

*Attesting Officer*    *Commissioner of Patents and Trademarks*